United States Patent [19]

Teraoka et al.

[11] Patent Number: 4,928,229

[45] Date of Patent: May 22, 1990

[54] LABEL PRINTER

[75] Inventors: Kazuharu Teraoka; Mitsuo Satake; Toshio Denda; Takashi Katayama; Shiro Seyasu, all of Tokyo, Japan

[73] Assignee: Teraoka Seiko Co., Ltd., Tokyo, Japan

[21] Appl. No.: 150,521

[22] Filed: Jan. 29, 1988

[30] Foreign Application Priority Data

| | | | |
|---|---|---|---|
| Jan. 30, 1987 | [JP] | Japan | 62-20008 |
| May 25, 1987 | [JP] | Japan | 62-127339 |
| Sep. 30, 1987 | [JP] | Japan | 62-247709 |

[51] Int. Cl.[5] .......... G01G 23/22

[52] U.S. Cl. .......... 364/464.01; 177/4; 177/5; 177/25.15; 364/466

[58] Field of Search .......... 177/4, 5, 25.15; 364/464.01, 466, 567

[56] References Cited

U.S. PATENT DOCUMENTS

| | | | |
|---|---|---|---|
| 3,985,605 | 10/1976 | Treiber et al. | 156/384 |
| 4,423,486 | 12/1983 | Berner | 364/466 |
| 4,503,503 | 3/1985 | Suzuki | 364/464.01 |
| 4,529,871 | 7/1985 | Davidson | 235/383 |
| 4,543,766 | 10/1985 | Bashinski | 53/502 X |
| 4,598,780 | 7/1986 | Iwasaki et al. | 177/3 |
| 4,615,757 | 10/1986 | Treiber | 177/4 X |
| 4,674,269 | 6/1987 | Denda | 53/502 |

FOREIGN PATENT DOCUMENTS

| | | |
|---|---|---|
| 0208203 | 1/1987 | European Pat. Off. . |
| 60-161167 | 8/1985 | Japan . |

OTHER PUBLICATIONS

Computertechnik fur den Etikettendruck, *Technishe Rundschan*, vol. 73, No. 19, May 5, 1985, p. 13.

Self-Adhesive Labelling, *Packaging*, vol. 52, No. 612, Mar. 1981, pp. 30–45.

*Primary Examiner*—Parshotam S. Lall
*Assistant Examiner*—Edward R. Cosimano
*Attorney, Agent, or Firm*—Darby & Darby

[57] ABSTRACT

The label printer comprises at least two printing units and a control unit. Each printing unit can print a specific label under the control of the control unit. The label is printed with information concerning a commodity, such as a price and a weight of the commodity. One or two printed labels are attached at predetermined positions on the commodity. Further, the two printing units can be moved so that each printing unit can attach each printed label on the commodity.

32 Claims, 44 Drawing Sheets

23a
| IMAGE NO. | HEAD ADDRESS |
|---|---|
| --- | --- |
| 2 | A2 |
| --- | --- |
FIG.6A
23a
| POP NO. | HEAD ADDRESS |
|---|---|
| --- | --- |
| 5 | B5 |
| --- | --- |
FIG.6B
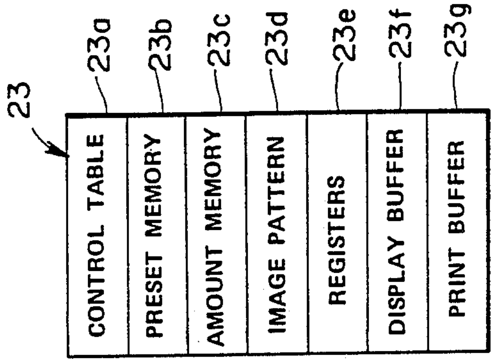
FIG.5
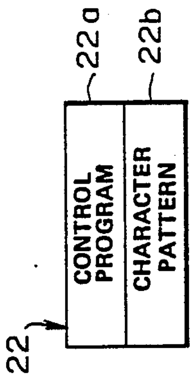
FIG.4
23b
| COMMODITY NO. | UNIT PRICE | PAPER BAG | EFFECTIVE DAYS | COMMODITY NAME | IMAGE NO. | POP NO. |
|---|---|---|---|---|---|---|
| --- | --- | --- | --- | --- | --- | --- |
| 0105 | 160 | 2 | 3 | ROAST PORK | 2 | 5 |
| --- | --- | --- | --- | --- | --- | --- |
FIG.7

23c

| COMMODITY NO. | WEIGHT | PRICE |
|---|---|---|
| ⋮ | ⋮ | ⋮ |
| 0105 | 21362 | 34179 |
| ⋮ | ⋮ | ⋮ |

23a-1 PRINT FORMAT TABLE

| | LABEL KIND | COMMODITY NAME POSITION | PRICE POSITION | ---------------- |
|---|---|---|---|---|
| LARGE | 1 | | | |
| ↕ | 2 | | | |
| | 3 | | | |
| SMALL | ⋮ | | | |

FIG.12

23a-2 MOUNTED LABEL STORING AREA

| LABEL PRINTING MECHANISM | LABEL KIND |
|---|---|
| 3 | 1 |
| 4 | 5 |

FIG.13

23b PRESET MEMORY

| COMMODITY NO. | UNIT PRICE | PAPER BAG WEIGHT | EFFECTIVE DAYS | COMMODITY NAME | LABEL KIND |
|---|---|---|---|---|---|
| ⋮ | ⋮ | ⋮ | ⋮ | ⋮ | ⋮ |
| 105 | 160 | 2 | 3 | ROAST PORK | 1 |
| ⋮ | ⋮ | ⋮ | ⋮ | ⋮ | ⋮ |

FIG.14

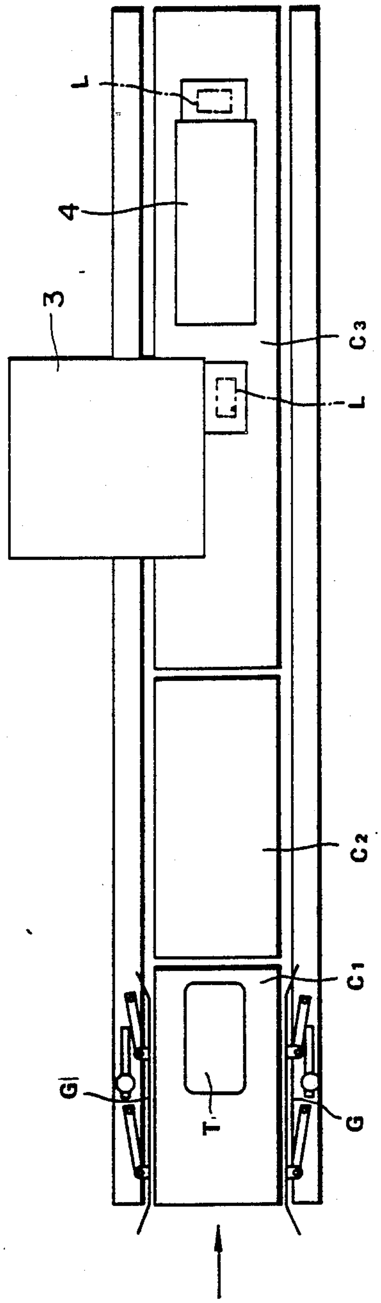
FIG.22
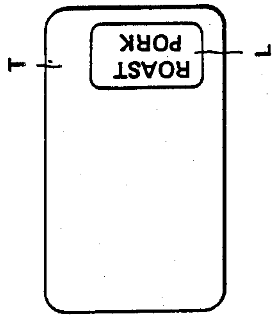
FIG.24B
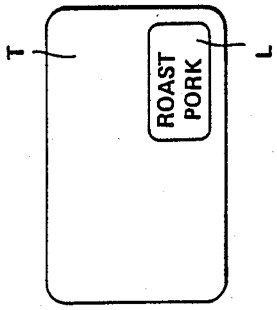
FIG.24A
23b
| COMMODITY NO. | UNIT PRICE | ------------- | LENGTH, WIDTH |
|---|---|---|---|
| | | | 0 |
| | | | 1 |
| --- | --- | --- | |
FIG.23

PRESET DATA FILE

609b

| COMMODITY NO. | UNIT PRICE | PAPER BAG | COMMODITY NAME | USED LABELER | PACKING PARAMETER |
|---|---|---|---|---|---|
| ⋮ | ⋮ | ⋮ | ⋮ | ⋮ | ⋮ |
| 125 | 150 | 3 | CHOPPED PORK | 1ST LABELER | 3 |
| ⋮ | ⋮ | ⋮ | ⋮ | ⋮ | ⋮ |

LABEL PRINTING BUFFER

| | COMMODITY NO. | UNIT PRICE | WEIGHT | PRICE | COMMODITY NAME | USED LABELER |
|---|---|---|---|---|---|---|
| PREVIOUSLY WEIGHING DATA → | 125 | 150 | 200 | 300 | CHOPPED PORK | 1ST LABELER |
| PRESENTLY WEIGHING DATA → | 245 | 120 | 100 | 120 | CHICKEN | 2ND LABELER |

LABEL PRINTER

BACKGROUND OF THE INVENTION

1. Field of the Invention

The present invention generally relates to a label printer, and more particularly to a label printer which provides a plurality of printer units each capable of printing out a different label and which selects one or more of the printer units to print out labels.

2. Prior Art

Recently, it is likely to attach several kinds of labels on one commodity in super-markets and general markets. For example, the commodity is attached with an advertisement label (or a POP label) printed with characters such as "SPECIAL PRICE" and "ADVERTISED GOODS", in addition to a pricing label (or a weight label) printed with a price of the commodity calculated based on a measured weight thereof As such pricing label, several kinds of labels each size corresponding to the kind of each commodity are used.

In order to satisfy the above-mentioned condition, the following two methods can be employed.

(1) The market must use a plurality of label printers each independently corresponding to the kind of each label.

(2) Programs capable of printing out a plurality kinds of labels must be stored in one label printer, and the labels must be exchanged according to needs.

However, in the above (1) method, a plurality of label printers must be required, so that the costs of whole printer apparatus must be raised. In the above (2) method, it is burdensome to exchange the labels.

In order to solve the above problems, the present applicant has been proposed a measuring and printing apparatus in a Japanese Patent Unexamined Publication No. 60-161167. Such apparatus uses a label sheet in which two kinds of labels are attached on a mount in parallel and also has a thermal head the length of which corresponds to a width of such label sheet. Hence, this thermal head can simultaneously print out two kinds of labels.

However, the above-mentioned proposed apparatus suffers the following five new problems.

(a) The proposed apparatus uses the label sheet attached with two kinds of labels. Hence, when it is required to print out only one label, the proposed apparatus prints only one label. Therefore, another un-printed label must be wasted.

(b) Formation of the label sheet becomes complicated, so that such label sheet will raise the running cost of the proposed apparatus. In addition, it must be required to prepare many kinds of label sheets in response to the kind of the labels and the combination of the labels.

(c) The thermal head is required to have the size capable of simultaneously printing two kinds of labels. Hence, it must be difficult to print a label having a large size.

(d) In order to exchange the kind of the labels, the operator must exchange the set label sheet. Hence, it is burdensome for the operator to exchange the label sheet.

(e) In general, the label printer is designed to take the printed label off the mount and publish the printed label. Hence, the size of the label sheet must be limited so that lengths of the two labels can be equal to each other in a longitudinal direction of the label sheet.

SUMMARY OF THE INVENTION

It is accordingly a primary object of the present invention to provide a label printer capable of printing plural kinds of labels without exchanging the labels by itself.

In a first aspect of the invention, there is provided a label printer comprising: (a) a plurality of label printing mechanisms each printing dot patterns on each label; and (b) a printer control means for selectively controlling printing operations of the label printing mechanisms.

In a second aspect of the invention, there is provided a label printer comprising: (a) a plurality of printing mechanisms each printing out a specific label; (b) setting means for setting a label kind of a label to be printed out and a printing content represented by print data by every commodity number; (c) memory means for storing data representative of the label kind and the print data both set by the setting means; and (d) control means for automatically selecting one or some of the printing mechanisms corresponding to the commodity number based on the label kind and the print data both stored in the memory means, whereby one or some labels are printed out.

In a third aspect of the invention, there is provided a label printer for printing a label so as to attach the printed label on a commodity comprising: (a) guiding means for guiding the commodity to a predetermined label attaching position; (b) a plurality of printing units each capable of printing a specific label, one or some of printed labels being attached on the commodity at the label attaching position; and (c) moving means for selectively moving the printing units so that each printing unit can attach each printed label on the commodity.

In a fourth aspect of the invention, there is provided a label printer comprising: (a) guiding means for guiding a commodity to a predetermined label attaching position; (b) first and second printing units each capable of printing a specific label, one of the first and second printing units selectively publishing a printed label which is attached on the commodity at the label attaching position; and (c) moving means for selectively moving the first and second printing units so that each printing unit can attach each printed label on the commodity.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 4 shows a memory map of a read only memory (ROM);

FIG. 5 shows a memory map of a random access memory (RAM);

FIGS. 6A and 6B are conceptional views showing control tables;

FIG. 7 is a conceptional view showing a table of a preset memory;

FIG. 12 is a conceptional view showing a print format table according to a first modified example of the first embodiment;

FIG. 13 is a conceptional view showing an attached label storing area;

FIG. 14 is a conceptional view showing a table of the preset memory;

FIG. 22 is a diagrammatical plan view showing a label printer according to a fourth modified example of the first embodiment;

FIG. 23 is a conceptional view showing a table of a preset memory;

FIGS. 24A and 24B are fragmentary plan views showing examples of label attaching methods;

DESCRIPTION OF THE PREFERRED EMBODIMENTS

Figure 1:
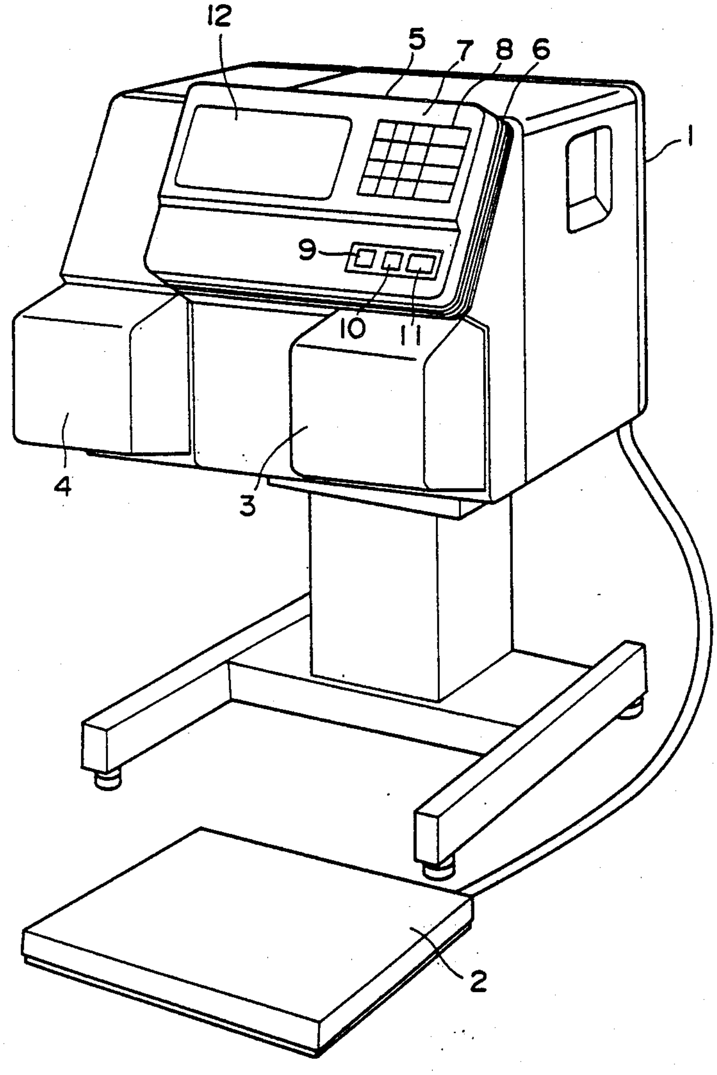
FIG. 1 is a perspective side view showing a first embodiment of the label printer according to the present invention.

Referring now to the drawings, wherein parts identical to those in several drawings will be designated by the same numerals.

[A] FIRST EMBODIMENT

Description will be given with respect to a label printer according to a first embodiment of the present invention in conjunction with FIGS. 1 to 11. In these drawings, FIGS. 1 and 2 both show a mechanical construction of the first embodiment. In these drawings, 1 designates a whole label printer which provides a control portion therein, and a weighing equipment 2 is connected to the control portion. On a front surface of the label printer 1, first and second label printing mechanisms 3 and 4 and an operator console 5 are provided. The second label printing mechanism 4 can be removed from the label printer 1, and an operator panel of the operator console 5 is mounted to the label printer 1 by use of bellows 6 for adjusting an angle thereof so that the angle of the operator panel can be adjusted. The operator console 5 provides a ten-key 7, a function key 8, a label field switch 9, a zero reset switch 10, a power switch 11 and a display panel 12. This display panel 12 consists of a liquid crystal display equipment which can display an operation guide and an error message other than input data, weight data, preset data and amount data and the like.

In this first embodiment, a touch panel (not shown) is provided on a display face of the display panel 12. This touch panel is formed by a transparent panel, and this touch panel covers a front face of the display panel. Pressure sensors are embedded at several positions of the touch panel, and this touch panel is supported by these pressure sensors. For example, these pressure sensors are embedded at three positions such as a center position of upper edge portion and both side positions of lower edge portion of the touch panel. Hence, a depressing force (or pressure) applied at one point on the touch panel is divided and applied to three pressure sensors, and a pressure dividing rate can be directly determined in response to a position where the depressing force is applied. Therefore, coordinates of the depressing position on the display face of the display panel 12 can be obtained by analyzing output signals of the three pressure sensors. For this reason, it is possible to input several kinds of data into the label printer 1 based on such coordinates and a display content of the display panel 12. As a result, the touch panel and the operator console 5 constitute inputting means for inputting several kinds of data into the label printer 1.

Figure 2:
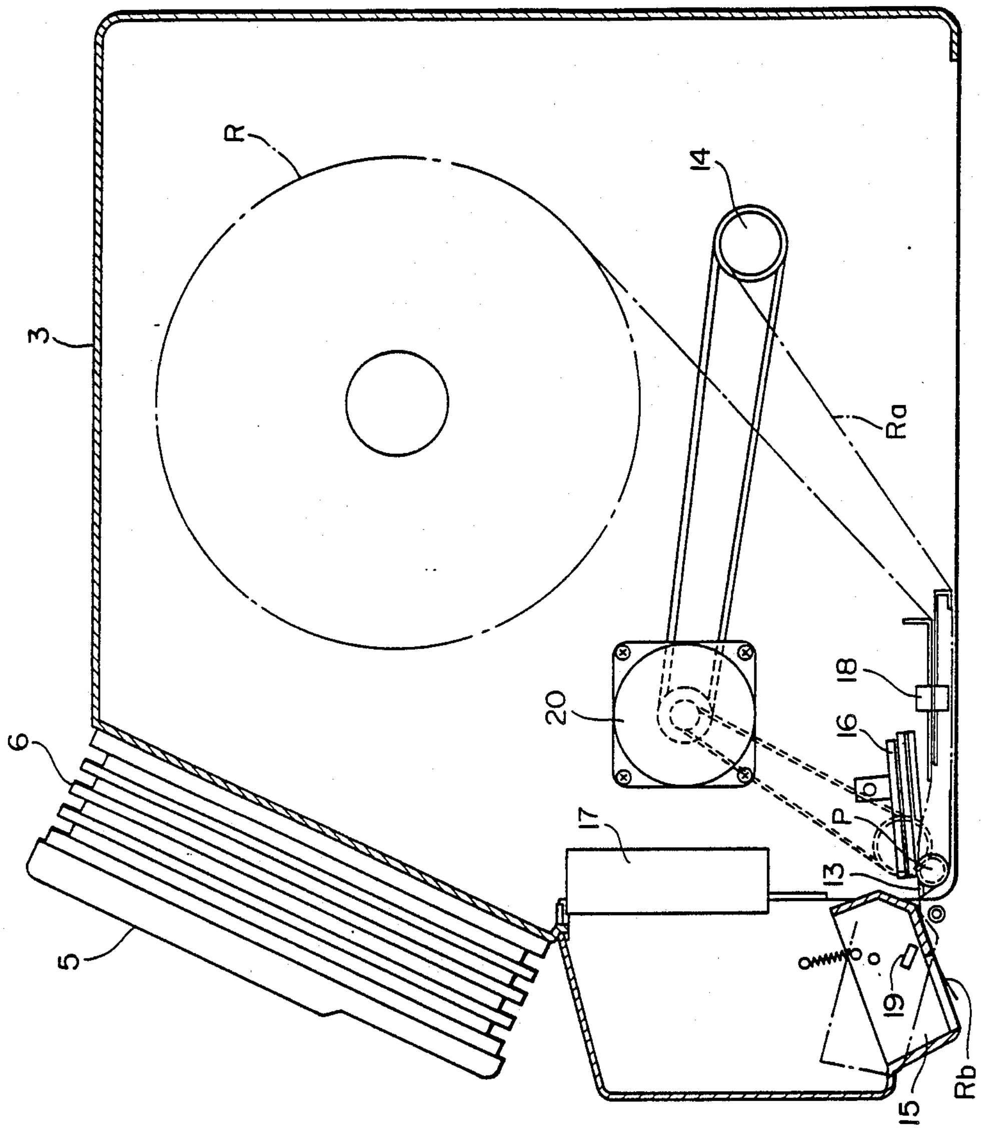
FIG. 2 is a sectional view showing a printing mechanism portion of the first embodiment.

The first and second label printing mechanisms 3 and 4 have the same construction. Hence, description will be given with respect to the construction of the first label printing mechanism 3 only in conjunction with FIG. 2, and description of the second label printing mechanism 4 will be omitted. In FIG. 2, a label roll R is a roll-shaped sheet which consists of labels attached on a long mount. This label roll R is pulled out by a platen roller P, and a separating member 13 takes a label Rb off a mount Ra. Then, a transporting direction of the mount Ra is changed so that the mount Ra is taken up by a take-up shaft 14, while the label Rb is adsorbed on an adsorbing portion 15. Before the label Rb is taken off the mount Ra, a head 16 prints the label Rb, and then the printed label Rb is adsorbed to the adsorbing portion 15 under a negative pressure generated by a fan 17. Thereafter, the printed label Rb is attached to the commodity by pressing the adsorbing portion 15 against the commodity. This adsorbing portion 15 can be revolved within a predetermined angle range so that the adsorbing portion 15 can be pressed against the commodity with ease and an unnecessary pressing impulse force may not be applied to the label printer 1. On a front side of the platen roller P, a label detector 18 is provided in order to detect a small space formed between two labels. In addition, the adsorbing portion 15 provides another label detector 19 which detects whether the label Rb exists or not, i.e., whether the label Rb is taken off or not. Further, a pulse motor 20 drives both of the platen roller P and the take-up shaft 14.

Figure 3:
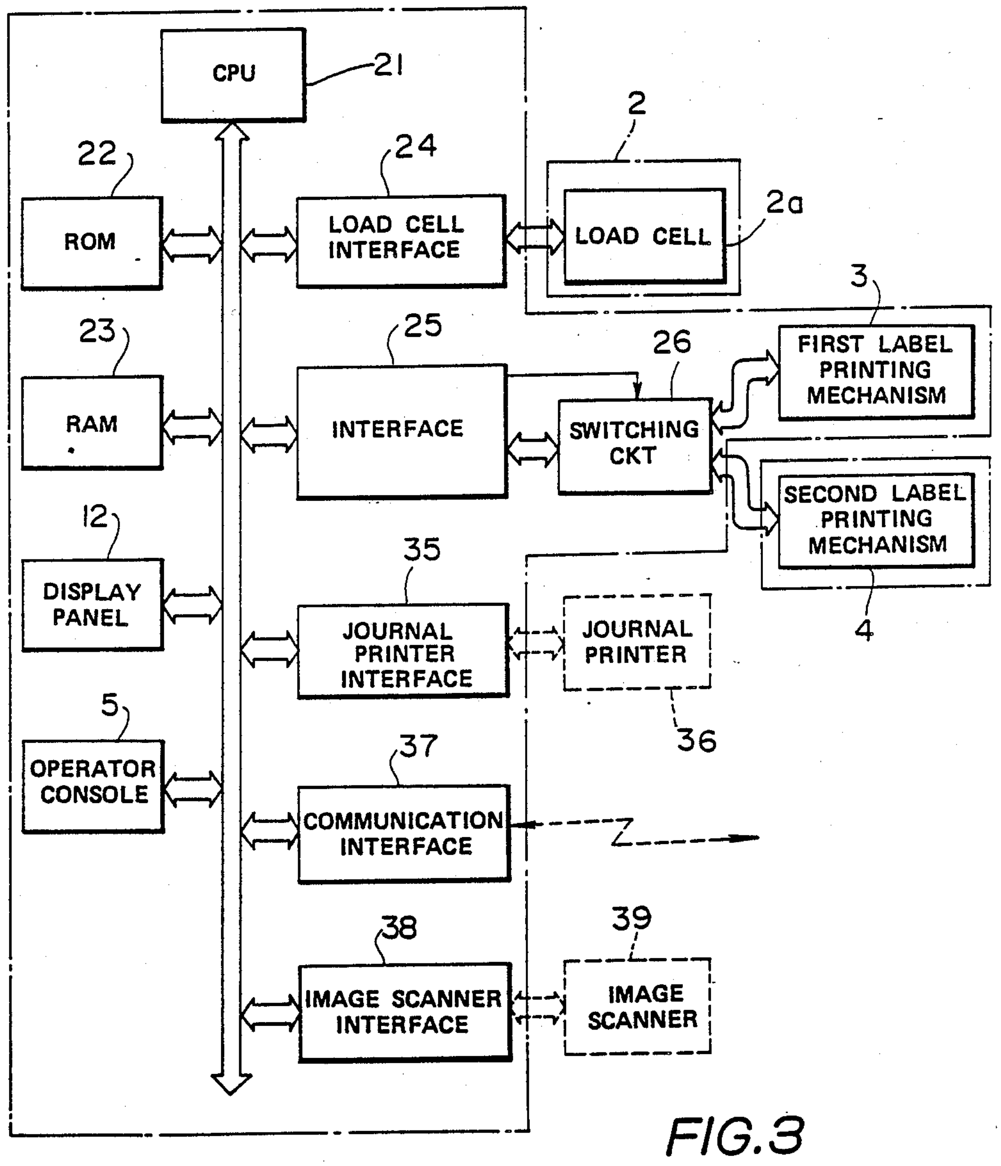
FIG. 3 is a block diagram showing the first embodiment.

FIG. 3 is a block diagram showing the whole system of the label printer 1. In FIG. 3, 21 designates a central processing unit (CPU), and 22 designates a read only memory (ROM). This ROM 22 consists of a control program memory 22a for storing control programs for the CPU 21 and a character pattern memory 22b for storing character patterns as shown in FIG. 4. This character pattern memory 22b stores several kinds of character patterns having three kinds of sizes such as (16×16) dots, (16×8) dots and (7×5) dots. By selecting a character code, the character pattern corresponding to the selected character code can be read out from the character pattern memory 22b. In addition, 23 designates a random access memory (RAM) which consists of a control table 23a, the preset memory 23b, the amount memory 23c, an image pattern memory 23d, several kinds of registers 23e, a display buffer 23f and a print buffer 23g as shown in FIG. 5.

Next, description will be given with respect to a constitution of the RAM 23 in conjunction with FIGS. 6A to 9. As shown in FIG. 7, the preset memory 23b stores a unit price of the commodity (i.e., a price at a unit weight of the commodity), a weight of a paper bag, effective days, a commodity name, an image number for the weight label and a number of the advertisement label in correspondence with the commodity number to be printed out. For example, the preset memory 23b stores information of the unit price "160 yen/100 grams", the weight of the paper bag "2 grams", the effective days "3 days", the commodity name "ROAST PORK" (the character code of which is stored in the preset memory 23b), the image number "2" for the weight label and the number "5" for the advertisement label (in other name, a POP label). These several kinds of data can be stored in the preset memory 23b by operating the operator console 5. In addition, it is possible to input data into the preset memory 23b from an external device (not shown) via a communication interface 37 which will be described later.

Figures 8, 9:
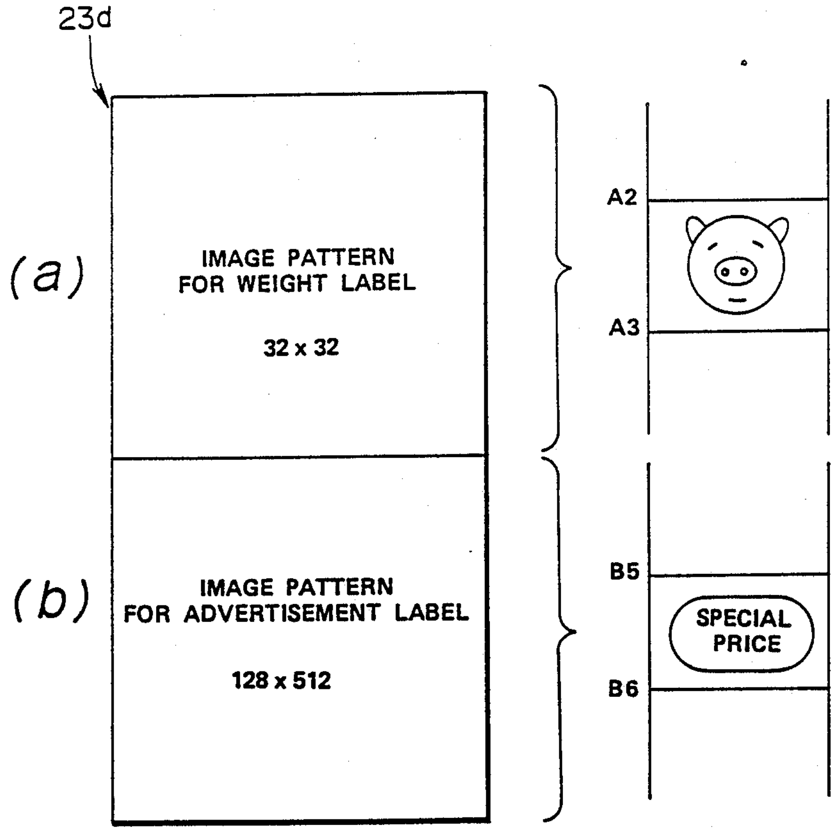
FIG. 8 is a conceptional view showing a table of an amount memory.
FIG. 9 is a conceptional view showing an image pattern memory.

The amount memory 23c stores result data representative of the printed and published labels by every commodity number, and the amount memory 23 provides a storing portion for storing information of an amount weight and an amount price as shown in FIG. 8. The image pattern memory 23d provides a first storing portion for storing image patterns for the weight label and a second storing portion for storing other image patterns for the advertisement label respectively as shown as (a) and (b) in FIG. 9. For example, the first storing portion stores image patterns each having a size of (32×32) dots, and data representative of an image of "pig" for the weight label used for the roast pork are stored at an address A2 of this first storing portion. On the other hand, the second storing portion stores image patterns each having a size of (128×512) dots, and data representative of an image of "SPECIAL PRICE" for the advertisement label are stored at an address B5 of this second storing portion.

The control table 23a stores several kinds of control data for determining specifications of the label printer 1. There are two storing portions as shown in FIGS. 6A and 6B provided within one part of the control table 23a. The storing portion shown in FIG. 6A stores a head address of the image pattern memory 23d where the image pattern of the image number is stored by every image number for the weight label. For example, "A2" is stored as the head address of the image number "2". On the other hand, the storing portion shown in FIG. 6B stores another head address of the image pattern memory 23d where the image pattern of the label number is stored by every label number for the advertisement label. For example, "B5" is stored as the head number of the label number "5".

The above-mentioned control table 23a, the preset memory 23b, the amount memory 23c and the image pattern memory 23d may be all backed up by batteries, or each of these memories may be constituted by a non-volatile RAM. Therefore, these memories do not erase the stored contents thereof if the power is off in this label printer. In addition, the registers 23*e* are the registers for storing control flags and for effecting several kinds of operations. Further, the display buffer 23*f* temporarily stores displayed contents of the display panel 12, and the print buffer 23*g* temporarily stores printed contents of the first and second label printing mechanisms 3 and 4.

In FIG. 3, 24 designates an interface for a load cell 2*a* provided to the weighing equipment 2, and 25 designates an interface for the printing mechanisms 3 and 4. In addition, a switching circuit 26 is connected between the interface 25 and the printing mechanisms 3 and 4.

Figure 10:
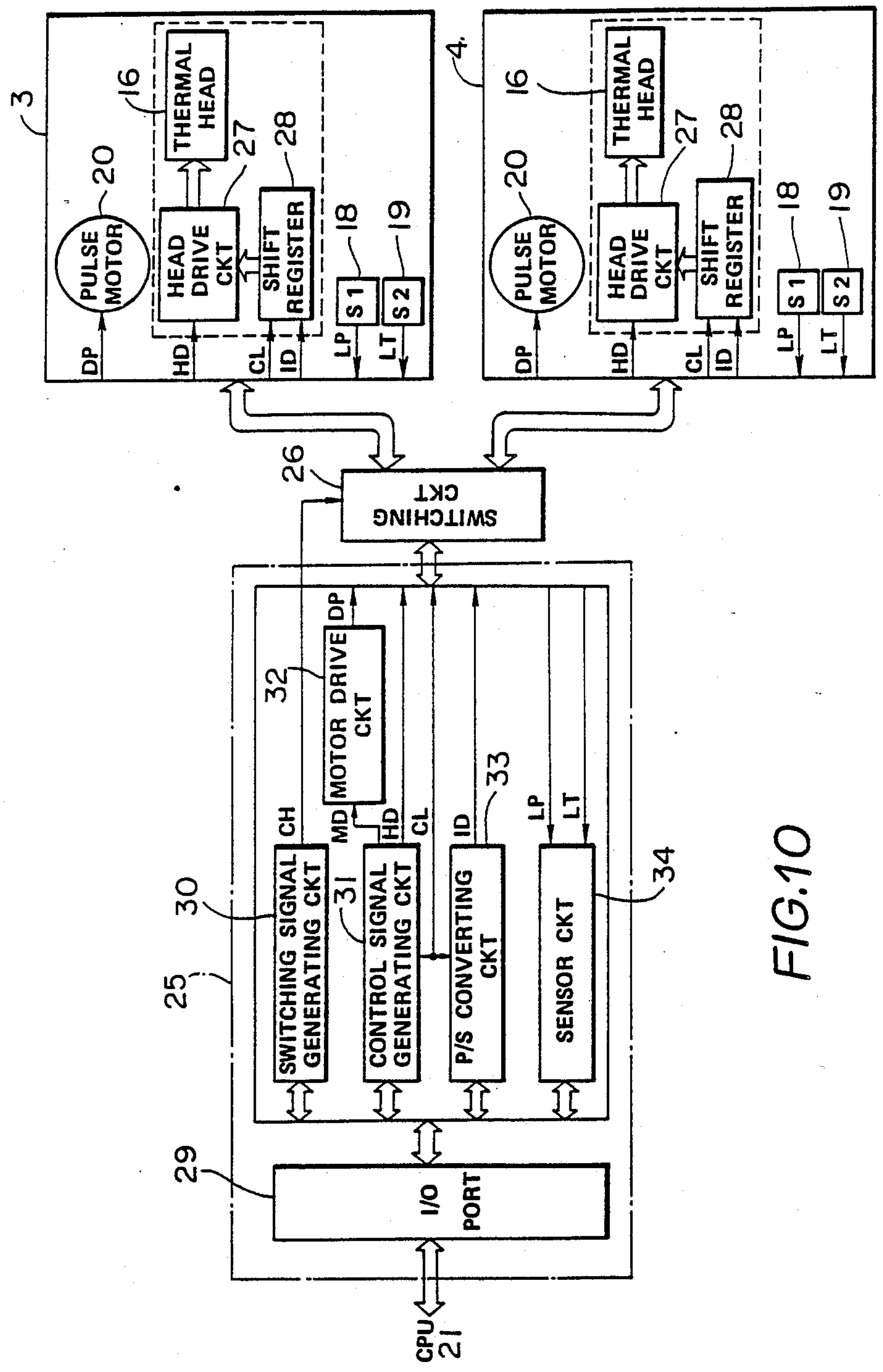
FIG. 10 is a block diagram showing an essential portion of the first embodiment.

Next, description will be given with respect to an electric constitution of the printing mechanisms 3 and 4 in conjunction with FIG. 10 by referring to a relation between the interface 25 and the switching circuit 26.

The first and second label printing mechanisms 3 and 4 have the same electric constitution, hence, description will be given with respect to the first label printing mechanism 3 only. In FIG. 10, a head drive circuit 27, a shift register 28 and a thermal head 16 are all formed on the same head base plate. This shift register 28 is supplied with print data ID which has been subjected to a parallel-to-serial conversion (which will be described later), and the shift register 28 stores one line of print data. Thereafter, a drive signal HD is supplied to the head drive circuit 27 so that desirable heating resistors provided within the thermal head 16 are heated based on the stored contents of the shift register 28. Thus, the label Rb is printed with images and characters of one line. Then, a drive pulse DP is supplied to the pulse motor 20 so that the label Rb steps forward. By repeatedly performing the above-mentioned operations, the first label printing mechanism 3 prints images and characters on the label Rb. In addition, the interface 25 is supplied with a label position detecting signal LP outputted from the label detector 18 and a label take-out detecting signal LT outputted from another label detector 19 via the switching circuit 26. The second label printing mechanism 4 is constituted by the same parts as the first label printing mechanism 3, hence, description thereof will be omitted.

Based on a switching signal CH outputted from the interface 25, the switching circuit 26 selects one of the first and second label printing mechanisms 3 and 4 so as to connect the selected label printing mechanism to the interface 25.

The above interface 25 is connected to an internal bus (not shown) via an I/O port 29, and this interface 25 controls the switching circuit 26 and the label printing mechanisms 3 and 4 by predetermined timings under a control of the CPU 21. Within the interface 25, 30 designates a switching signal generating circuit for generating the switching signal CH, 31 designates a control signal generating circuit, 32 designates a motor drive circuit, 33 designates a parallel-to-serial (P/S) converting circuit and 34 designates a sensor circuit. The control signal generating circuit 31 generates a control signal MD for the motor drive circuit 32 and a clock pulse CL in addition to the head drive signal HD described before. The print data stored in the print buffer 23*g* of the RAM 23 described before are inputted in parallel to the P/S converting circuit 33 wherein such parallel print data are converted into serial print data ID in synchronism with the clock pulse CL. The sensor circuit 34 inputs the detecting signals LP and LT respectively outputted from the label detectors 18 and 19 so as to detect the condition of the label sheet. The detecting signal LP controls an operation for stepping the label Rb forward, and another detecting signal LT controls to stop the next printing operation until the printed label Rb is taken off from the adsorbing portion 15.

In FIG. 3, 35 designates a journal printer interface for an externally connected journal printer 36, 37 designates a communication interface for communicating with a managing apparatus (not shown) for managing external data, and 38 designates an image scanner interface for an externally connected image scanner 39. This image scanner 39 registers image patterns stored in the image pattern memory 23*d* of the RAM 23 in correspondence with predetermined calling numbers. As for the image patterns, users can register all of the image patterns. Or, makers can also provide partial image patterns.

Figure 11:
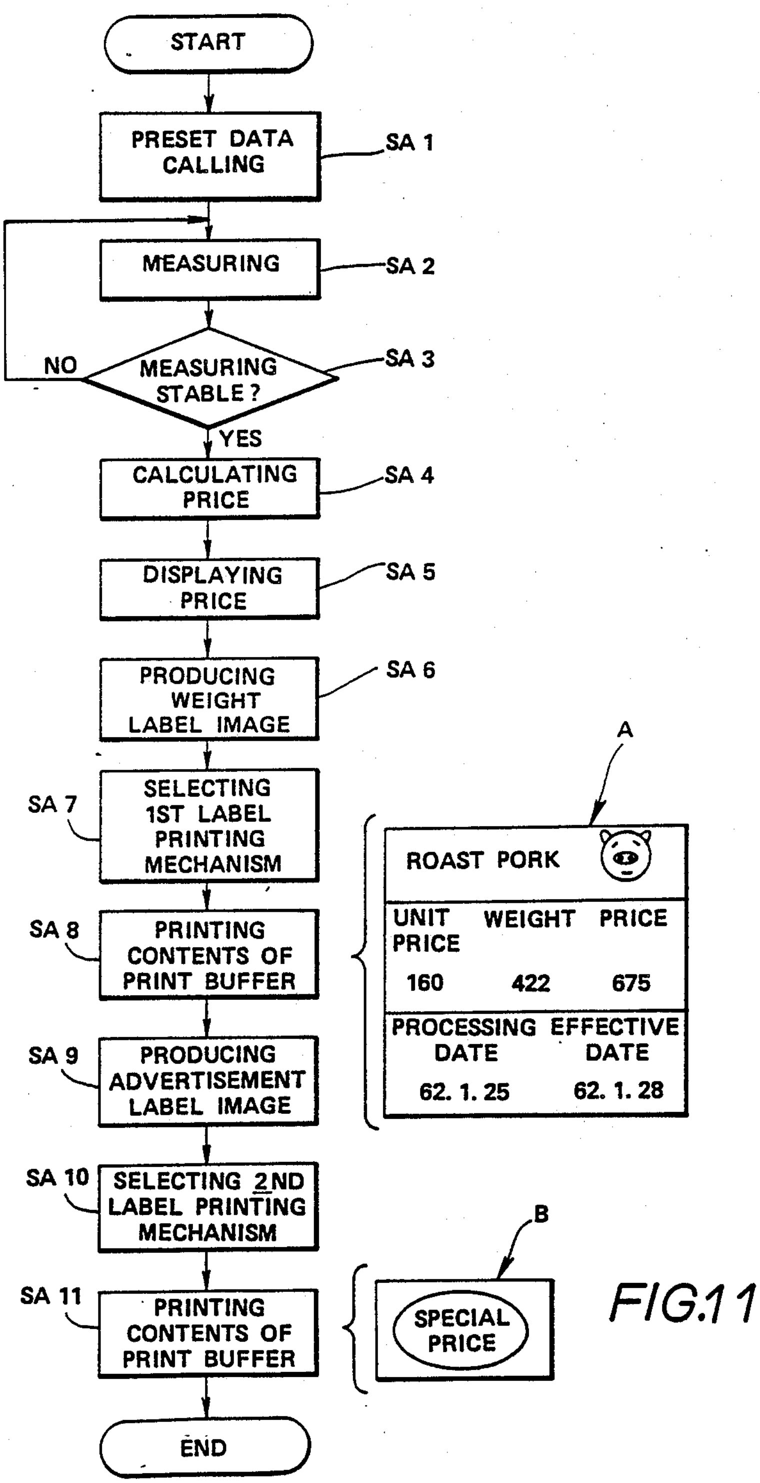
FIG. 11 is a flow chart for explaining a printing operation of the first embodiment.

Next, description will be given with respect to the printing operation of the first embodiment by referring to the flow chart shown in FIG. 11. At a first step SA1, the operator operates keys of the operator console 5 so as to read the preset data corresponding to each commodity kind from the preset memory 23*b* of the RAM 23. The contents of such read preset data are displayed on the display panel 12. If it is necessary to change partial preset data at this time, the operator slightly depresses a certain position of an area where the contents of data are displayed by his finger so as to designate a changing portion at first. Thereafter, the operator can change the partial data by inputting new data by use of the ten-key 7. In this state, the commodity can be put on a weighing pan of the weighing equipment 2. In the case where the commodity is the roast pork, the operator must sequentially depress "1", "0", "5" and "COMMODITY NUMBER" keys so as to read storing data corresponding to a commodity number "0105" from the preset memory 23*b*, and then the roast pork must be put on the weighing pan. In this case, the data read from the preset memory 23*b* represent information of the unit price "160 yen" (per 100 grams), the paper bag weight "2 grams", the effective days "3 days", the commodity number "roast pork", the image number "2" for the weight label and the image number "5" for the advertisement label as shown in FIG. 7.

At a next step SA2, the weight of the commodity including the paper bag weight is measured based on the detection signal of the load cell 2*a* of the weighing equipment 2. Under a condition where the measured weight is judged as a stable weight in a step SA3, the price of the commodity is calculated based on the measured weight in a step SA4. If the weight is judged unstable, the process returns to step SA2, where the commodity weight is measured again. Steps SA2 and SA3 are repeated until the weight is stable. In case where the total weight of the measured weight of the roast pork including the paper bag weight is equal, for example, to 424 grams, a weight of 422 grams is calculated by subtracting 2 grams (of the paper bag weight) from the 424 grams. Based on this weight of 422 grams and the unit price of 160 yen, the price of the roast pork can be calculated. In this case, the price of the roast pork may equal to 675 yen based on the following formula.

$$422\ (g) \times 160\ (\text{yen}/100\ g)/100 = 675\ (\text{yen})$$

In this calculation, the calculated price omits the figure below the first decimal place of the actually calculated price.

Such calculated price of the commodity is displayed on the display panel 12 in a step SA5. Thereafter, a weight label image is produced in a next step SA6. Such weight label image is produced on the print buffer 23*g* of the RAM 23 based on the data read from the preset memory 23*b*. For example, in case of the roast pork, the weight label image is produced in order to print a weight label A. In the case where characters such as "UNIT PRICE", "WEIGHT", "PRICE", "PROCESSED DATE" and "EFFECTIVE DATE" have been already printed on the weight label Rb, the CPU 21 produces characters and figures excluding above-mentioned characters, i.e., figures each corresponding to the weight, the price, the processed date, characters "ROAST PORK" and the image of "pig" as the weight label image. Among these figures, the processed date can be obtained by using date data of a self-contained real time clock (not shown), or such processed date is inputted by using keys of the operator console 5. In addition, the effective date can be obtained by adding data representative of the effective days read from the preset memory 23*b* to data representative of the processed date. Further, the characters "ROAST PORK" can be produced by reading out the character pattern corresponding to the commodity name (i.e., the character code) read from the preset memory 23*b*. Furthermore, the image of "pig" can be produced based on the image number "2" of the weight label which is read from the preset memory 23*b*. More specifically, the head address A2 corresponding to the image number "2" is read from the control table 23*a* of the RAM 23, and the image pattern (i.e., the image of "pig") is read from the address A2 of the image pattern memory 23*d*. Such read image pattern is used as the required image within the weight label image.

As described heretofore, the weight label image is produced in the print buffer 23*g*. Thereafter, the CPU 21 selects the label printing mechanism in order to print such weight label image on the weight label in a step SA7. In this first embodiment, the first label printing mechanism 3 is selected for printing the weight label. Due to this selection, the switching circuit 26 connects the first label printing mechanism 3 to the interface 25.

Thereafter, the first label printing mechanism 3 prints the contents of data stored in the print buffer 23*g* so as to publish the weight label in a step SA8. In case of the roast pork, the weight label A shown in FIG. 11 is published, for example.

After publishing the weight label A, the CPU 21 starts to produce the advertisement label in a step SA9. This advertisement label image is produced on the print buffer 23*g* of the RAM 23 based on the advertisement label number read from the preset memory 23*b*. For example, in case of the roast pork, the CPU 21 produces an advertisement label image in order to print the advertisement label B shown in FIG. 11, i.e., the CPU 21 produces an image in which the characters "SPECIAL PRICE" enclosed with an ellipse. Such image is produced based on the advertisement label number "5" read from the preset memory 23*b*. More specifically, the CPU 21 reads the head address B5 corresponding to the advertisement label number 5 from the control table 23*a* of the RAM 23. Thereafter, the CPU 21 reads the image pattern from the head address B5 of the image pattern memory 23*d*. Such read image pattern is used as the advertisement label image.

As described heretofore, the advertisement label image is produced on the print buffer 23*g*. Thereafter, the CPU 21 selects the label printing mechanism for printing the above-mentioned image on the advertisement label in a step SA10. In the first embodiment, the second label printing mechanism 4 is selected for printing the advertisement label. Due to such selection, the switching circuit 26 connects the second label printing mechanism 4 to the interface 25.

Thereafter, the second label printing mechanism 4 prints the contents of data stored in the print buffer 23*g* so as to publish the advertisement label in a step SA11. In case of the roast pork, the label printer 1 publishes the advertisement label B shown in FIG. 11.

By executing the above-mentioned operations on each commodity, the first and second label printing mechanisms 3 and 4 can print out and publish one pair of the weight label and the advertisement label for every commodity. If a certain advertisement label number is not preset in the preset data, the label printer 1 does not publish such advertisement label and the display panel 12 displays a message indicating the present condition.

In response to the above-mentioned operations of the label printer 1, the following four operations are mainly required for the operator.

(1) The operator must call the preset data from the preset memory 23*b*.

(2) The operator must put the commodity on the weighing pan of the weighing equipment 2.

(3) The operator must operate the label printer 1 so that the printed weight label can be attached to the commodity.

(4) The operator must operate the label printer 1 so that the advertisement label can be attached to the commodity.

Meanwhile, the image patterns to be printed are not limited to those shown in the first embodiment, and it is possible to arbitrarily produce print patterns of the advertisement label. For example, such print pattern can consist of a combination of the character pattern and the image pattern, or such print pattern can also consist of the character patterns only.

In the first embodiment, one of the two label printing mechanisms 3 and 4 is selected by use of a hardware, i.e., a switching circuit 26. Instead of the switching circuit 26, it is possible to constitute such that the two printing mechanisms 3 and 4 may be independently connected to the I/O ports, one of which can be selected by use of the software. In addition, the first embodiment provides two label printing mechanisms 3 and 4 independently and the label printing mechanism 4 can be removed from the label printer 1. Hence, when executing an operation for attaching the labels, the operator removes the label printing mechanism 4 from the label printer 1 and then arranges such mechanism 4 at a desirable position. Thus, the first embodiment can build up a preferable working environment in response to the position where the label printer 1 is used. Further, the first and second label printing mechanisms 3 and 4 have the same construction, and each of these mechanisms 3 and 4 is constructed by the same parts. Hence, the number of the parts does not increase in the first embodiment, and it is possible to assemble both of a first label printer with the second label printing mechanism 4 and a second label printer without the second label printing mechanism 4 in the almost same manufacturing process. As described heretofore, the first embodiment is quite preferable for the maker side in particular.

(1) First Modified Example of First Embodiment

Next, description will be given with respect to a label printer according to a first modified example of the first embodiment in conjunction with FIGS. 12 to 15. In these drawings, parts identical to those described in the first embodiment will be designated by the same numerals, and description thereof will be omitted.

This first modified example uses the first and second label printing mechanisms 3 and 4 in order to print different kinds of weight labels. More concretely, the first label printing mechanism 3 prints a relatively large weight label, and the second label printing mechanism 4 prints a relatively small weight label.

In this case, the preset memory 23*b* of the RAM 23 stores a label kind in addition to the commodity number, the unit price, the paper bag weight, the effective days and the commodity name as shown in FIG. 14. In correspondence with the commodity number "105", the preset memory 23*b* of the RAM 23 stores the information of the unit price "160 (yen/100 grams)", the effective days "3 (days)", the commodity name "ROAST PORK" and the label kind "1". Within the control table 23*a* of the RAM 23, a print format table 23*a*-1 (as shown in FIG. 12) and a mounted label storing area 23*a*-2 (as shown in FIG. 13) are formed. In response to the label kinds "1", "2", "3", . . . , the print format table 23*a*-1 stores data representative of a judgment whether each data of the commodity name, the price and the like must be printed or not. In addition, the print format table 23*a*-1 stores data representative of a printing position, a printing size, a printing direction and the like in response to each label kind when the printing operation must be performed. On the other hand, the mounted label storing area 23*a*-2 stores data representative of the label kinds of the labels which are respectively mounted to the first and second label printing mechanisms 3 and 4 at present. In a state as shown in FIG. 14, the first label printing mechanism 3 is mounted with a label having a label kind "1", and the second label printing mechanism 4 is mounted with a label having a label kind "5".

As methods for storing the label kinds in the mounted label storing area 23*a*-2, the following first and second methods can be employed. In the first method, the label kinds of the labels which are respectively mounted to the first and second label printing mechanisms 3 and 4 at present are inputted into the mounted label storing area 23*a*-2 by operating keys of the operator console 5. In the second method, the above mounted label kinds of the first and second label printing mechanisms 3 and 4 are automatically stored in the mounted label storing area 23*a*-2 based on detection signals outputted from the sensors mounted to the first and second label printing mechanisms 3 and 4. Especially, in the second method, the mounted label kinds can be automatically detected by use of a detector provided to a cassette for mounting the label sheet. Or, the mounted label kinds can be automatically detected based on a position of a guide member for the label in the second method. In this first modified example, the size of the label becomes smaller as the label kind number becomes larger. Hence, the size of the label having the label kind number "1" is the smallest.

Figure 15:
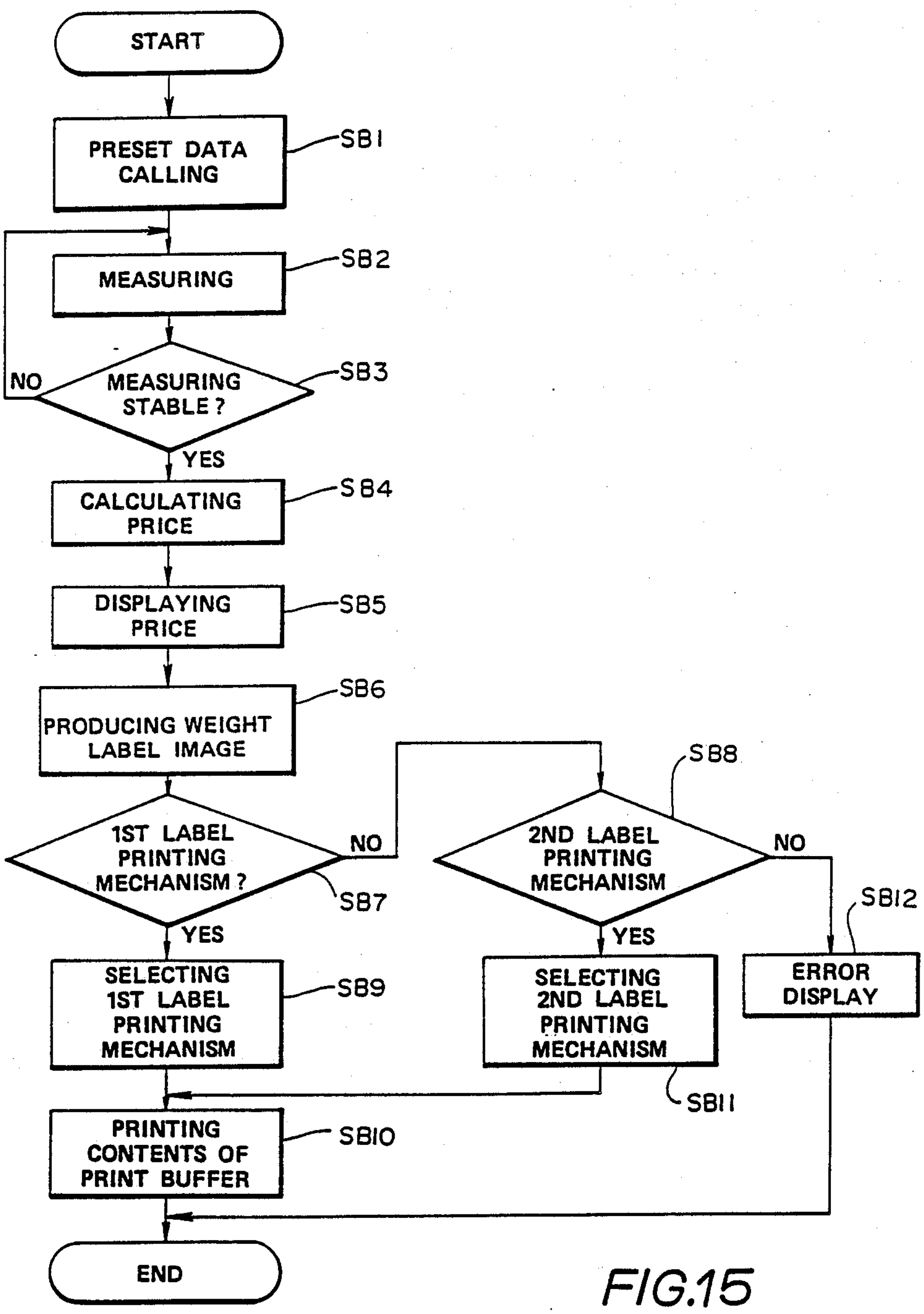
FIG. 15 is a flow chart for explaining a printing operation of the first modified example of the first embodiment.

Next, description will be given with respect to the printing operation of the first modified example in conjunction with FIG. 15. In FIG. 15, steps SB1 to SB6 are identical to the steps SA1 to SA6 of the first embodiment shown in FIG. 11, hence, description thereof will be omitted. However, the print format table 23*a*-1 as shown in FIG. 12 is used in order to produce the weight label image in the step SB6. After producing the weight label image, the CPU 21 selects one label printing mechanism to be printing the label in steps SB7 and SB8. In other words, these steps SB7 and SB8 judge which of the first and second label printing mechanisms 3 and 4 is mounted with the label, the kind of which is is selected by the preset data.

For example, in the case where the mounted label storing area 23*a*-2 stores the data having the contents FIG. 13, the label kind "1" will be selected by the preset data of the commodity number "105" as shown in FIG. 14. In this case, the CPU 21 judges that the label having the selected label kind "1" is mounted to the first label printing mechanism 3. In this case, the CPU 21 selects the first label printing mechanism 3 in a step SB9, so that the first label printing mechanism 3 prints the contents of data stored in the print buffer 23*g* on the label in a step SB10.

Similarly, in the case where the CPU 21 judges that the selected label is mounted to the second label printing mechanism 4, the CPU 21 selects the second label printing mechanism 4 in a step SB11, so that the contents of data stored in the print buffer 23*g* are printed on the label by the second label printing mechanism 4 in the step SB10. In the case where the label to be printed is not mounted to both of the first and second label printing mechanisms 3 and 4, the CPU 21 displays an error message on the display panel 12 in a step SB12.

In the above-mentioned first modified example of the first embodiment, the label kind is selected by the preset data. However, it is possible to re-modify the first modified example so that the preset data can select the kind of the label printing mechanism.

(2) Second Modified Example of First Embodiment

Next, description will be given with respect to the second modified example of the first embodiment in conjunction with FIGS. 16 to 19. In this second modified example, the first label printing mechanism 3 prints the weight label, and the second label printing mechanism 4 prints a total label. This total label is published by every predetermined cycle by every commodity. For example, this total label is printed with a total weight of the commodities which are attached with the labels in every publishing timing. The total label published by everyday is called a daily total label.

Figure 16:
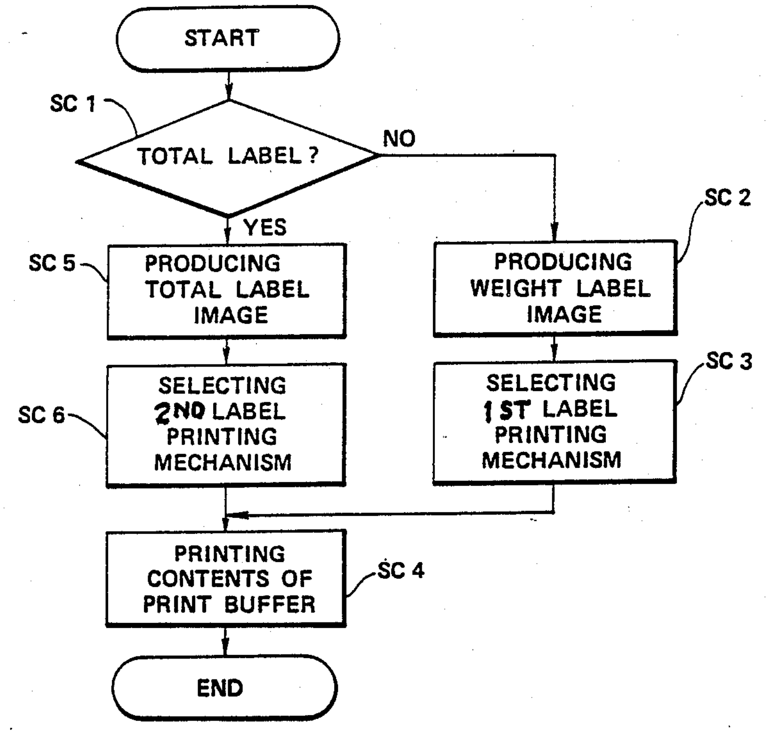
FIG. 16 is a flow chart for explaining a partial printing operation of a second modified example of the first embodiment.
Figure 17:
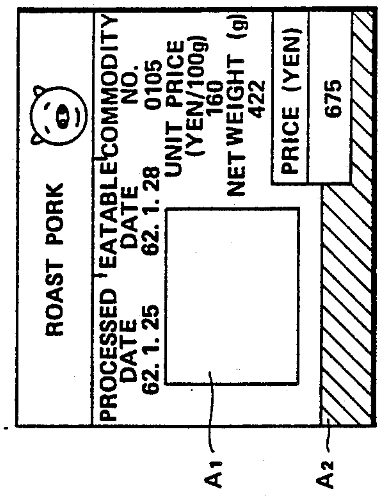
FIG. 17 is a fragmentary plan view showing a weight label.

FIG. 16 shows a flow chart which is executed by inputting a label printing command. First, a step SC1 judges whether the label to be printed is the weight label or the total label. In order to perform this judgment, the step SC1 checks the data which are inputted before the label printing command is inputted. In the case where the label to be printed is the weight label, the CPU 21 produces the weight label image in a step SC2 at first. Thereafter, the CPU 21 selects the first label printing mechanism 3 in a step SC3, so that the first label printing mechanism 3 prints the contents of data stored in the print buffer 23*g* on the weight label in a step SC4. Thus, the printed weight label is published. In an example of the weight label for the roast pork shown in FIG. 17, a bar code for discriminating the commodity is printed on a portion A1, and a market name and some messages are printed on a portion A2.

Figure 18:
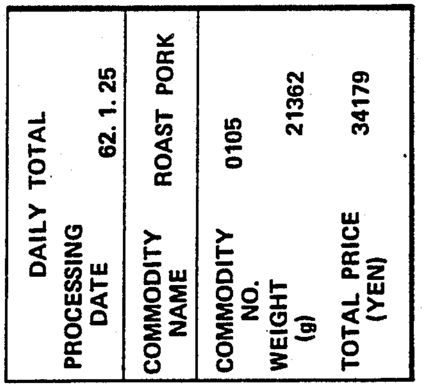
FIG. 18 is a fragmentary plan view showing a total label.
Figure 19:
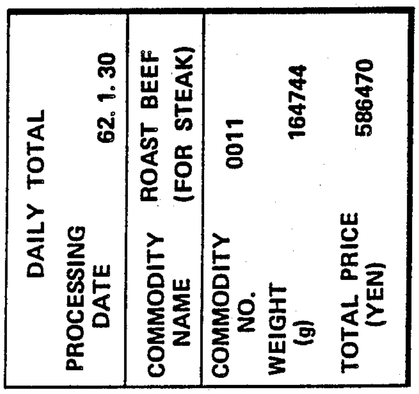
FIG. 19 is a fragmentary plan view showing another example of the total label.

On the other hand, in the case where the label to be printed is the total label, the CPU 21 produces a total label image at first in a step SC5. Thereafter, the CPU 21 selects the second label printing mechanism 4 in a step SC6, so that the second label printing mechanism 4 prints the contents of data stored in the print buffer 23*g* in the step SC4. Thus, the total label is published. FIG. 18 shows an example of the daily total label for the roast pork. This daily total label is printed with a total weight of the commodities treated in one day and a total money thereof in addition to the processed date, the commodity name and the commodity number. Therefore, in order to publish the daily total label, the data stored in the amount memory 23*c* must be used. FIG. 19 shows appearance of another example of the total label.

(3) Third Modified Example of First Embodiment

Figure 21:
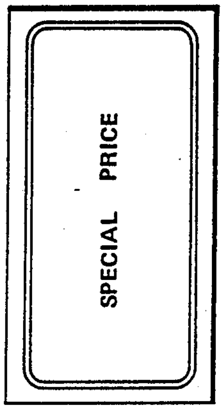
FIG. 21 a fragmentary plan view showing an advertisement label.
Figure 20:
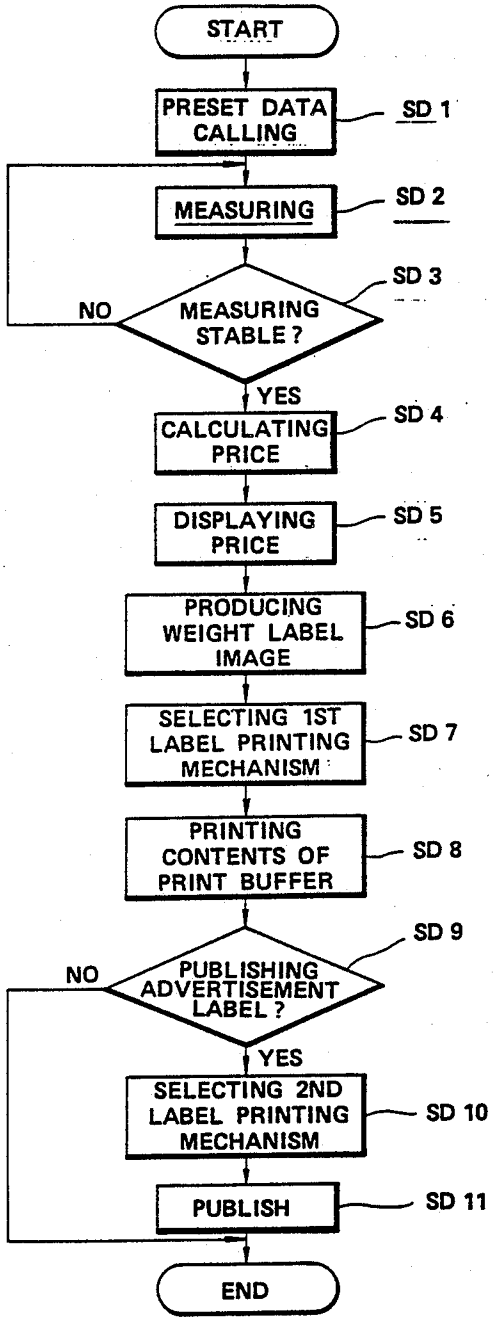
FIG. 20 is a flow chart for explaining a printing operation of a third modified example of the first embodiment.

Next, description will be given with respect to a third modified example of the first embodiment in conjunction with FIGS. 20 and 21. In this third modified example, the first label printing mechanism 3 prints the weight label, and the second label printing mechanism 4 publishes the advertisement label which has been printed in advance. In FIG. 20, steps SD1 to SD6 are similar to the steps SA1 to SA6 shown in FIG. 11, hence, description thereof will be omitted. After producing the weight label image, the CPU 21 selects the first label printing mechanism 3 in a step SD7, so that the first label printing mechanism 3 prints the contents of data stored in the print buffer 23*g* in a step SD8. Thus, the weight label is published. Based on the preset data of the commodity the weight label of which is to be published, the CPU 21 judges whether the advertisement label should be published or not in a step SD9. Therefore, in the commodity the advertisement label of which should be published, the preset data of such commodity must be preset with data meaning that the advertisement label thereof should be published. In the case where the advertisement label must be published, the CPU 21 selects the second label printing mechanism 4 in a step SD10, so that the second label printing mechanism 4 publishes the advertisement label in a step SD11.

The above-mentioned advertisement label has been already printed and is mounted to the second label printing mechanism 4. Therefore, as described before, the second label printing mechanism 4 does not print but merely publishes the advertisement label. FIG. 21 shows an example of the advertisement label which has been already printed with the characters "SPECIAL PRICE". If the preset data of the commodity are not preset with the data meaning that the advertisement label should be published, the label printer according to this third modified example does not publish the advertisement label but completes the printing operation thereof.

In the third modified example, the advertisement label has been already printed by a specific label printer (not shown), for example. However, it is possible to print the advertisement label by use of the label printer according to this third modified embodiment in advance. On the other hand, it is possible to publish the advertisement labels after printing all of the weight labels. Or it is also possible to publish the advertisement label at every time when one weight label is published. In addition, it is possible to print the advertisement labels before printing and publishing the weight labels. Further, it is possible to command the advertisement labels to be published by operating the keys, instead of using the preset data.

(4) Fourth Modified Example of First Embodiment

Next, description will be given with respect to a fourth modified example of the first embodiment in conjunction with FIGS. 22 to 24B. The label printer according to this fourth modified example is applied to a machine for automatically printing the measured weight. In this fourth modified example, the first and second label printing mechanisms 3 and 4 are independently used. More specifically, the first label printing mechanism 3 is used as a printing machine for printing and attaching the labels in a width direction, while the second label printing mechanism 4 is used as a printing machine for printing and attaching the labels in a length direction. As shown in FIG. 24A, a label L is attached to the commodity set on a tray T in the width direction. As shown in FIG. 24B, the label L is attached to the commodity set on the tray T in the length direction. In the machine shown in FIG. 22, the tray T is transported on a transporting conveyor C1, a weighing conveyor C2 and an attaching conveyor C3 in the length direction, and movable guides G are mounted at both sides of the transporting conveyor C1.

In this fourth modified example, data for discriminating the length and width directions are stored in the preset memory 23*b* as the preset data as shown in FIG. 23. When such data have the value "0", the label is attached on the commodity in the length direction. When such data have the value "1", the the label is attached on the commodity in the width direction. Based on such data, it is automatically judged that which of the first and second label printing mechanisms 3 and 4 prints, publishes and attaches the label L on the commodity. In the machine shown in FIG. 22, the commodity set on the tray T is carried from the transporting conveyor C1 to the weighing conveyor C2 wherein the weight of the commodity is measured while carrying the commodity on the weighing conveyor C2. Then, the price of the commodity is calculated based on the measured weight thereof.

Thereafter, the label is printed with the calculated price in addition to the weight, the unit price and the commodity name and the like. While the label is printed, it is judged whether the label must be attached to the commodity in the length direction or in the width direction based on the preset data corresponding to the commodity. Based on such judgment result, one of the first and second label printing mechanisms 3 and 4 is selected. Then, the selected label printing mechanism prints and publishes the label. At first, a label attaching equipment (not shown) holds the published label as it is. When the commodity reaches at a predetermined position on the attaching conveyor C3, such published label is attached on the commodity. The detailed construction of such label attaching equipment is well known, hence, description thereof will be omitted in this fourth modified example.

(5) Fifth Modified Example of First Embodiment

Next, description will be given with respect to a fifth modified example of the first embodiment briefly. In this fifth modified example, the first label printing mechanism 3 prints the weight label without the bar code, while the second label printing mechanism 4 publishes the label printed with the bar code.

[B] SECOND EMBODIMENT

Next, description will be given with respect to a label printer according to a second embodiment of the present invention in conjunction with FIGS. 25 to 42. In these drawings, parts identical to those in the first embodiment will be designated by the same numerals, hence, description thereof will be skipped.

Figure 25:
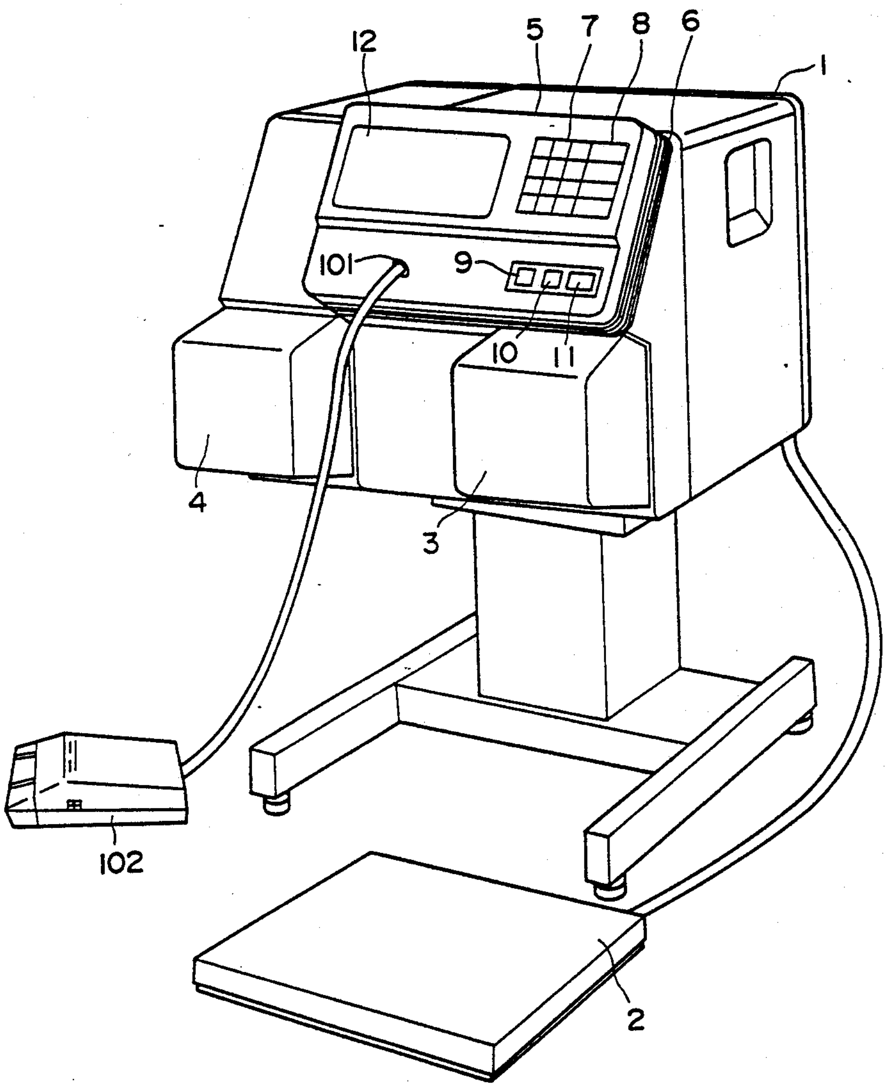
FIG. 25 is a perspective side view showing a label printer according to a second embodiment of the present invention.
Figure 26:
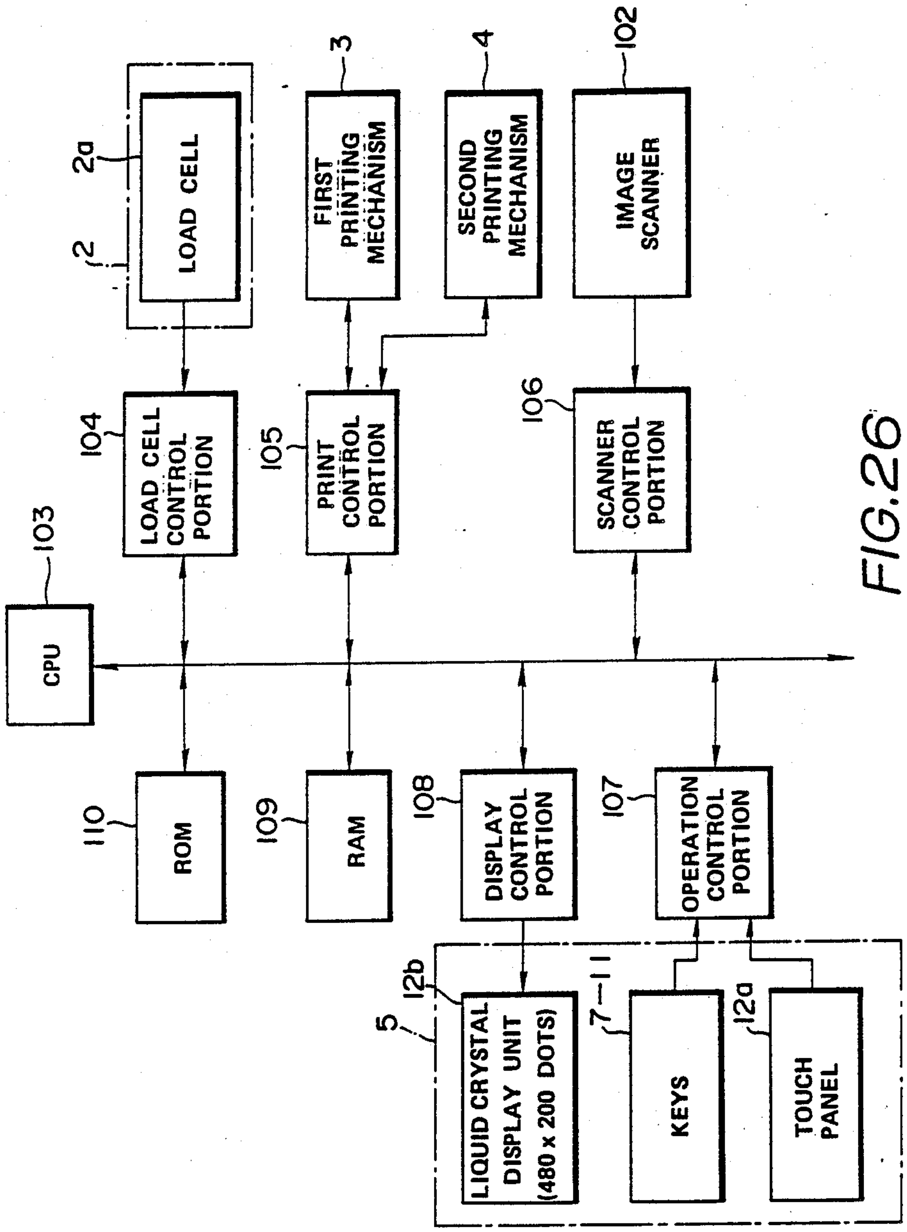
FIG. 26 is a block diagram showing the second embodiment.
Figure 28:
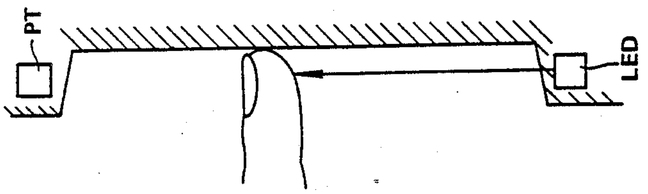
FIG. 28 is a fragmentary cross-sectional view for explaining an operation of a touch panel.

In FIGS. 25 and 26, each of the printing mechanisms 3 and 4 provides a thermal head for performing a dot printing operation, a shift register for temporarily storing data of one dot line and supplying such data to the thermal head, and a stepping motor. Hence, the printing mechanisms 3 and 4 can print arbitrary characters, figures and images on the labels. In addition, it is possible to set the weight labels each having a different size to the printing mechanisms 3 and 4. Further, it is possible to set the weight label to the first printing mechanism 3 and also set the advertisement label to the second printing mechanism 4. Thus, the printing mechanisms 3 and 4 can print different kinds of the labels.

Figure 27:
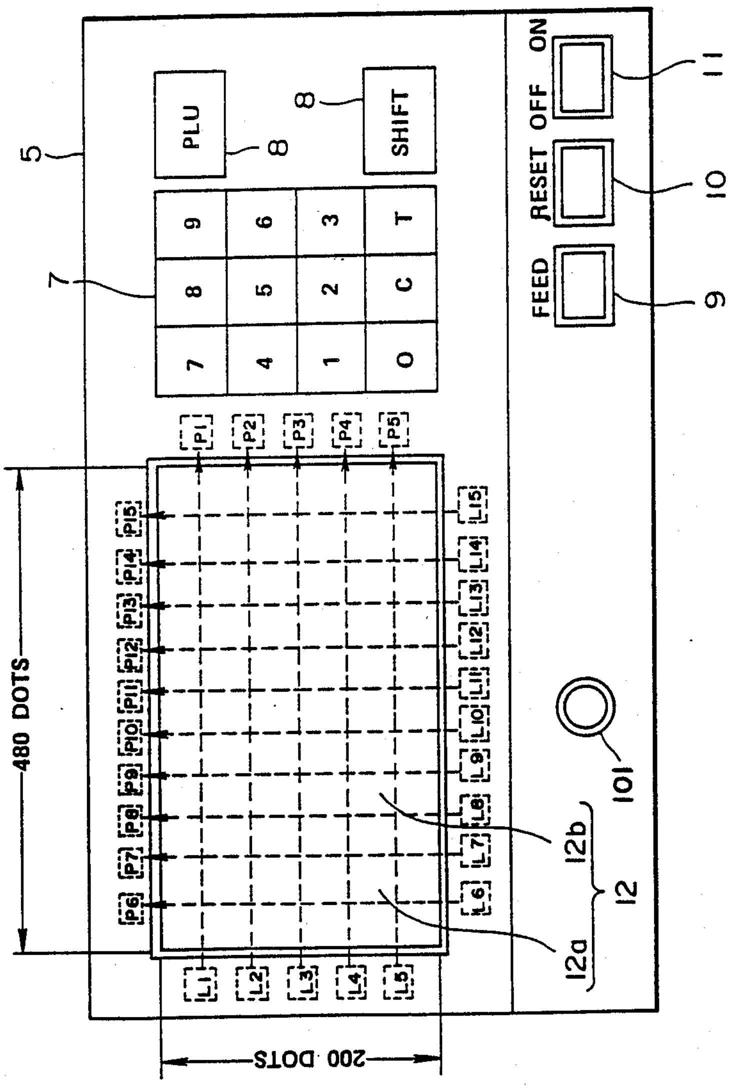
FIG. 27 is a fragmentary front view showing a front face of an operator console.

FIG. 27 shows a front view of the operator console 5 according to the second embodiment. In FIG. 27, the operator console 5 provides the ten-key 7, the function key 8, the label field switch 9, the zero reset switch 10 of the weighing equipment 2, the power switch 11, the display panel 12 and a connector 101 for connecting an image scanner 102 (FIG. 25) to the label printer 1. The function key 8 consists of a commodity number key PLU used for setting the unit price etc. and a shift key SHIFT which enables the ten-key 7 and the commodity number key PLU both to work as double function keys.

The display panel 12 is constructed by a liquid crystal display unit **12*b* on which a touch panel 12*a* is covered. Hence, this display panel 12 can not only display data but also input data. The liquid crystal display unit 12*b* can perform a dot display of 480×200 dots, so that this liquid crystal display unit 12*b*** can display several kinds of display patterns which will be described later.

Meanwhile, the touch panel **12*a* is arranged on the liquid crystal display unit 12*b*. Hence, this touch panel 12*a* can detect a certain position of the transparent panel where the operator touches, so that this touch panel 12*a* can input desirable data selected by the operator. More specifically, five light emitting diodes (LED) L1 to L5 are disposed vertically on a left side of the display panel 12, and five photo transistors P1 to P5 are disposed vertically on a right side of the display panel 12. The LED L1 to L5 are disposed opposite to the photo transistors P1 to P5 respectively. In addition, ten LED L6 to L15 are arranged horizontally on a lower side of the display panel 12, and ten photo transistors P6 to P15 are arranged horizontally on an upper side of the display panel 12. The LED L6 to L15 are arranged opposite to the photo transistors P6 to P15 respectively. Therefore, when the operator touches a certain position on the touch panel 12*a* by his finger, his finger cuts off an optical path between a certain LED and a certain photo transistor in correspondence with the touched position on the touch panel 12*a*. Thus, the control portion can recognize the touched position on the touch panel 12*a*** so as to input data corresponding to the touched position.

The above control portion can be connected to the image scanner 102 via the connector 101. This image scanner 102 provides a line sensor having a resolution of 8 dots/mm, hence, the image scanner 102 can read in an image having a maximum width of 64 millimeters (i.e., 512 dots). Each dot of the read image is converted into a one bit signal. More specifically, the level of such one bit signal is determined by comparing the brightness level of each dot with a (variable) reference level. When the brightness level of each dot exists in vicinity to a black level, the one bit signal is turned to a "1" signal (i.e., a signal having a "1" level). When the brightness level of each dot exists in vicinity to a white level, the one bit signal is turned to a "0" signal (i.e., a signal having a "0" level). Thus, the read image is converted into image data.

The parts as described heretofore are connected to the control portion shown in FIG. 26. First, the load cell **2*a* of the weighing equipment 2 is connected to a CPU 103 via a load cell control portion 104. The first and second printing mechanisms 3 and 4 are both connected to the CPU 103 via a printing control portion 105. The image scanner 102 is connected to the CPU 103 via a scanner control portion 106. Similarly, the touch panel 12*a* and several keys 7 to 11 are connected to the CPU 103 via an operation control portion 107, while the liquid crystal display unit 12*b* is connected to the CPU 103 via a display control portion 108. Incidentally, the scanner control portion 106 contains a buffer for storing the image data outputted from the image scanner 102. Further, the CPU 103 is connected with a RAM 109 and a ROM 110**.

Figure 29:
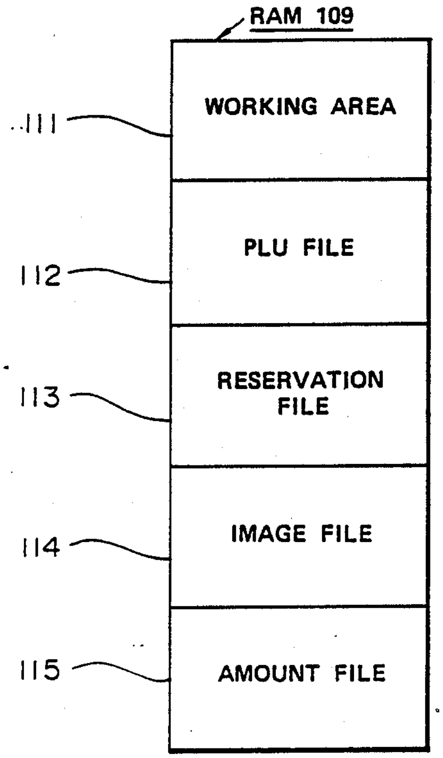
FIG. 29 is a conceptional view for explaining a constitution of a RAM.
Figure 30:
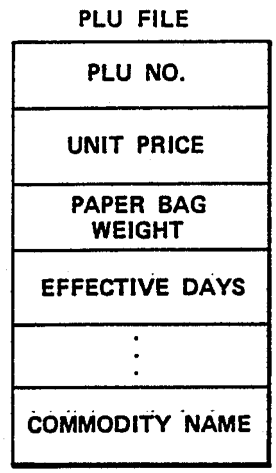
FIG. 30 is a conceptional view for explaining a constitution of a PLU file in the RAM shown in FIG. 29.
Figure 31:
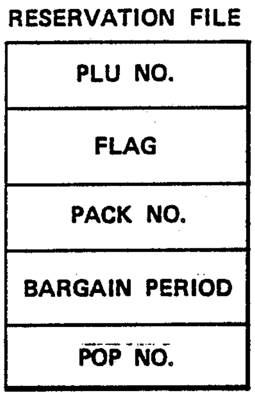
FIG. 31 is a conceptional view for explaining a constitution of a reservation file in the RAM shown in FIG. 29.
Figure 32:
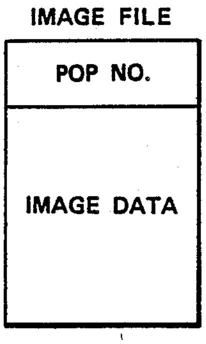
FIG. 32 is a conceptional view for explaining a constitution of an image file in the RAM shown in FIG. 29.
Figure 34:
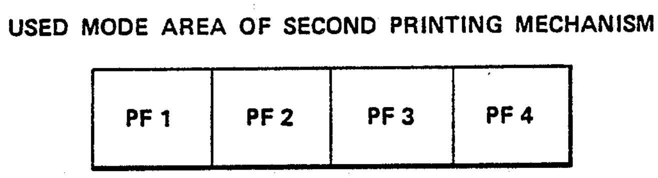
FIG. 34 is a conceptional view for explaining a constitution of a used mode flag area within a working area of the RAM.

FIG. 29 shows an inner construction of the RAM 109. This RAM 109 provides a working area 111, a Price Look-Up file (PLU file) 112, a reservation file 113, an image file 114 and an amount file 115 for storing amount data therein. This working area 111 contains several kinds of registers and a flag area for storing used mode flags PF1 to PF4 of the second printing mechanism 4 as shown in FIG. 34. Description of such flag area will be given later. As shown in FIG. 30, the PLU file 112 stores information of the unit price, the paper bag weight, the effective days, the commodity name and the like by every commodity number (i.e., PLU No.). In addition, the reservation file 113 (FIG. 31) stores information of the several kinds of flags, a pack number (i.e., a number of the treated commodities), a bargain period for selling bargains, the POP No. and the like in correspondence with the PLU No. This reservation file is a fixed word length file, hence, it is possible to obtain an area for all items by setting only one item. As shown in FIG. 32, the image file 114 stores the image data by every POP No.

Figure 33:
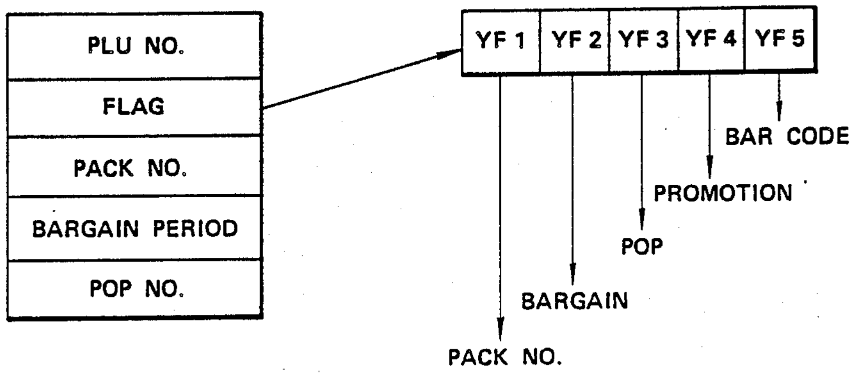
FIG. 33 is a conceptional view for explaining a constitution of a flag area within the reservation file.

As shown in FIG. 33, the flags stored in the reservation file 113 include a flag YF1 which is set when the pack number, i.e., a number of labels to be printed are reserved, a flag YF2 which is set when the bargains are reserved or bargain commodities are selected, a flag YF3 which is set when a publication of the advertisement label is reserved, a flag YF4 which is set when a publication of a promotion label (which will be described later) is reserved, and a flag YF5 which is set when a publication of a bar code label (which will be described later) is reserved. In order to set the flag YF1, it is necessary to set a reserved pack number to the reservation file 113. In order to set the flag YF2, it is necessary to set the bargain period. In order to set the flag YF3, it is necessary to set the POP No.

Figure 40:
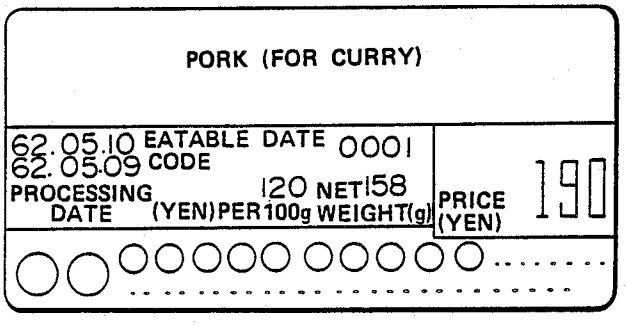
FIG. 40 is a fragmentary plan view showing an example of the weight label.

The above-mentioned promotion label has a shape and a printing format of a general weight label as shown in FIG. 40. However, this promotion label differs in the color of the print data, a color of the label sheet or contents of pre-printing patterns. For example, in order to attract attention of customers on advertised commodities, the promotion label may be colored by a color (such as red color, yellow color etc.) which is different from that of other labels. Or, a label sheet which is pre-printed with characters "ADVERTISED COMMODITY" is used as the un-printed label of the promotion label. In this case, an advertisement phrase such as a phrase of "ADVERTISED COMMODITY" can be printed by use of the label printer. However, the pre-printed characters "ADVERTISED COMMODITY" can be looked easier than those printed by the label printer. In addition, it is also advantageous in that the printing patterns may not be limited in the pre-printing operation, compared with the printing operation of the label printer.

Figure 41:
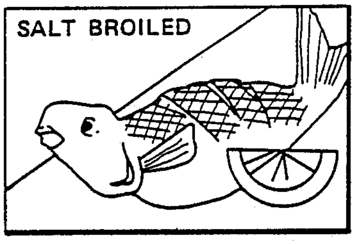
FIG. 41 is a fragmentary plan view showing an example of the POP label.

Meanwhile, the advertisement label is printed as shown in FIG. 41.

Figure 42:
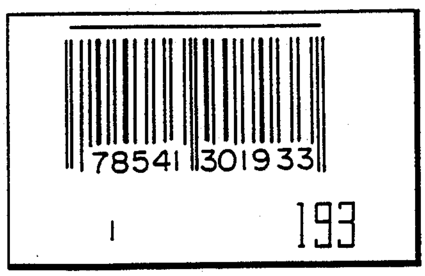
FIG. 42 is a fragmentary plan view showing an example of a bar code label.

As shown in FIG. 42, the bar code label is printed with a bar code representative of the price and the like which are printed on the weight label shown in FIG. 40. This bar code label is mainly attached at a bottom of the commodity in order to read such bar code by use of a fixed scanner (not shown). For example, this attaching operation is performed on some commodities which must not be reversed in accordance with the commodity nature thereof and which require the label to be small.

Meanwhile, the number of days within the bargain period which is set by setting the flag YF2 must be decreased as the present date changes. For example, if today's date is May 1 and "3 days" are set as the number of days within the bargain period, such number of days changes to "2 days" on May 2, such number of days changes to "1 day" on May 3, and such number of days changes to "0 day" on May 4 when the bargain period has been already over. In this case, the bargain price of the bargain commodity is preset in the PLU file 112. Hence, the PLU file 112 is constituted so that two kinds of prices such as a normal price and a bargain price can be set to the PLU file 112.

The ROM 110 stores character patterns and several kinds of programs such as a weighing processing program, a printing processing program and a display processing program.

Next, description will be given with respect to a method for inputting publication data of the labels. This method includes a first process for setting the used mode flags PF1 to PF4 of the second printing mechanism 4 within the working area 111, and a second process for setting the reservation file 113 within the RAM 110. In the following description, each of these first and second processes will be described independently.

(1) First Process for Setting Used Mode Flags PF1 to PF4

The first printing mechanism 3 is specifically used for publishing the weight labels. On the other hand, the second printing mechanism 4 provides the following four use objects.

(a) Un-used.

(b) Publish the promotion labels.

(c) Publish the advertisement (POP) labels.

(d) Publish the bar code labels.

In response to these using objects (a) to (d), the used mode flags PF1 to PF4 are set as follows.

Figure 35A:
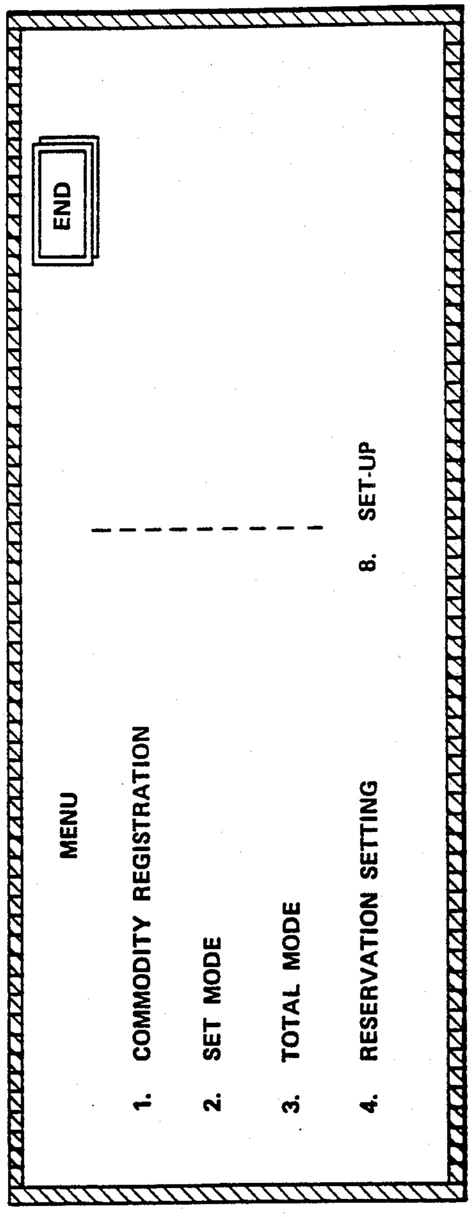
FIGS. 35A to 35G show displayed images on a display panel when publish data of the label are inputted.

First, a menu image as shown in FIG. 35A is displayed on the display panel. In this state, the operator selects a message "8. SET-UP" by touching a position where such message is displayed, so that a set-up mode is selected. Thereafter, it becomes possible to select a specification selecting mode of the first printing mechanism 3, a specification selecting mode of the second printing mechanism 4, and a data inputting mode concerning the bar codes. Further, after selecting the specification selecting mode of the second printing mechanism 4, it becomes possible to select a first selection mode for selecting the using object of the second printing mechanism 4, and a second selection mode for selecting the label size used in the second printing mechanism 4.

When the operator selects the first selection mode for selecting the using object of the second printing mechanism 4, the display panel 12 can display four messages such as "UNUSED", "PROMOTION", "POP" and "BAR CODE" each corresponding to each of the using objects (a) to (d). In this case, the displayed message corresponding to the presently selected using object can be clearly discriminated from the other displayed messages. In short, the displayed message corresponding to the presently selected using object is subjected to a reverse display. For example, in the case where the using object (c) for publishing the POP label is selected, the message "POP" is displayed so that such message "POP" can be discriminated from other messages. When the operator wants to change this using object (c) to the using object (b) for publishing the promotion label, the operator must touch a position where the message "PROMOTION" is displayed. Thus, the message "PROMOTION" will be displayed so that this message "PROMOTION" can be discriminated from the other messages, whereby the using object (b) will be selected.

As described heretofore, one of the using objects (a) to (d) for the second printing mechanism 4 is selected so as to set one of the flags PF1 to PF4 (shown in FIG. 34) within the working area 111 in correspondence with the selected using object. More specifically, the flag PF1 is set when the using object (a) is selected, the flag PF2 is set when the using object (b) is selected, the flag PF3 is set when the using object (c) is selected, and the flag PF4 is set when the using object (d) is selected.

Incidentally, when the operator selects one of the using objects (a) to (d) for the second printing mechanism 4, it is necessary to set the label sheet corresponding to the selected using object to the second printing mechanism 4.

(2) Second Process for Setting Reservation File 113

Figure 35B:
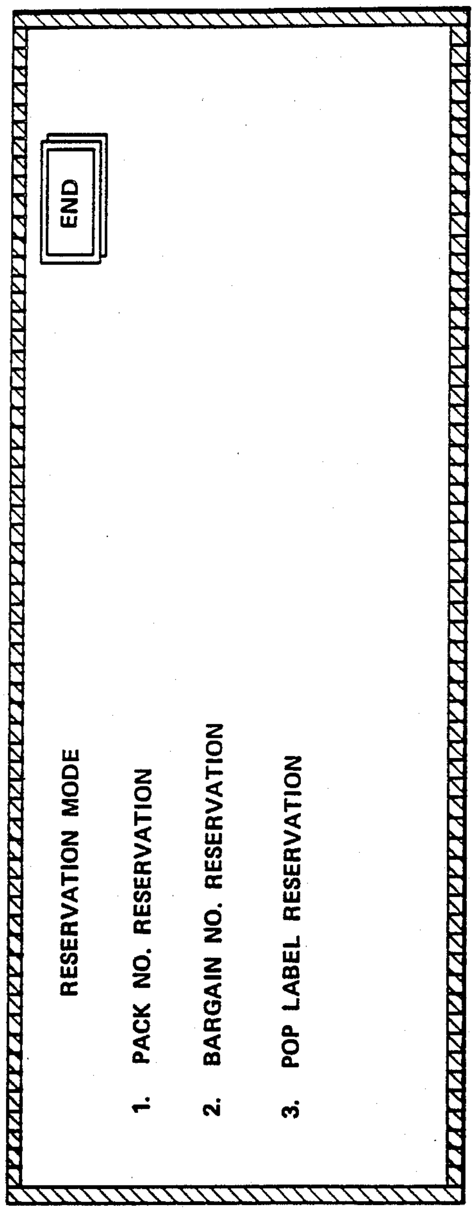

First, the menu image (shown in FIG. 35A) must be displayed on the display panel 12. Then, the operator must touch a position on the display panel 12 where a message "4. RESERVATION SETTING" is displayed. Thus, the displayed image is turned to a reservation mode image as shown in FIG. 35B, hence, the display panel 12 displays three kinds of messages each selecting one of three kinds of predetermined reservations. In FIG. 35B, the first message is "PACK NO. RESERVATION", and the second message is "BARGAIN NO. RESERVATION". The third message corresponds to the using objects (a) to (d) for the second printing mechanism 4. More specifically, this third message corresponds to the contents of the used mode flags PF1 to PF4 which are set in the first process (1) described before. When the using object (c) for publishing the POP label is selected, a message "POP LABEL RESERVATION" is displayed as the third message as shown in FIG. 35E. When the using object (b) for publishing the promotion label is selected, a message "PROMOTION LABEL RESERVATION" is displayed as the third message. When the using object (d) for publishing the bar code label is selected, a message "BAR CODE LABEL RESERVATION" is displayed as the third message. On the contrary, when the using object (a) representing that the second printing mechanism 4 is not used is selected, no message is displayed as the third message.

(2-1) First Message

By touching a first position where the above-mentioned first message "PACK NO. RESERVATION" is displayed in the reservation mode image shown in FIG. 35B, it becomes possible to reserve the pack number in the reservation file 113 shown in FIG. 31.

Figure 35C:
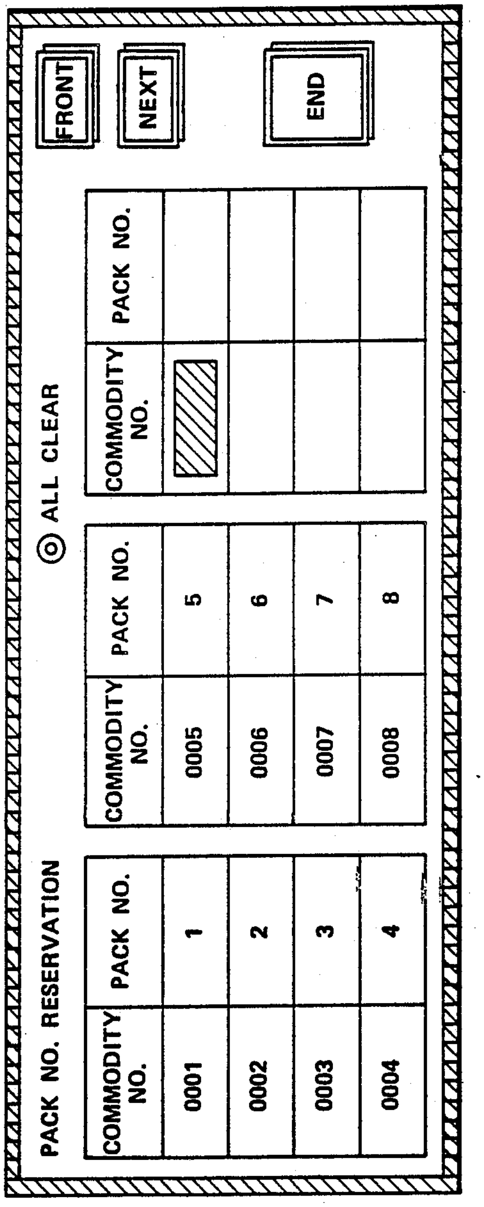

More specifically, the displayed reservation image will be turned to a display image as shown in FIG. 35C by touching the above first position. In this display image, the operator can input the commodity numbers and the pack numbers by operating the ten-key 7 and the PLU key 8 shown in FIG. 27. In the display image shown in FIG. 35C, each of the predetermined pack numbers is reserved in correspondence with each of the commodity numbers "0001" to "0008" in advance. In this case, each contents of data stored in the reservation file 113 must be predetermined as shown in FIGS. 36A to 36H in correspondence with each of the commodity numbers "0001" to "0008". As shown in FIGS. 36A to 36H, a pack number "1" is preset to the commodity number "0001", a pack number "2" is preset to the commodity number "0002", . . . , a pack number "8" is preset to the commodity number "0008". The data other than data representative of these pack numbers will be described later. In this second embodiment, the commodity numbers continues from "0001" to "0008". However, when some of the commodity numbers are not reserved, the commodity number will not continue.

(2-2) Second Message

By touching a second position where the second message "BARGAIN NO. RESERVATION" is displayed in the reservation mode image shown in FIG. 35B, it becomes possible to reserve the bargain numbers.

Figure 35D:
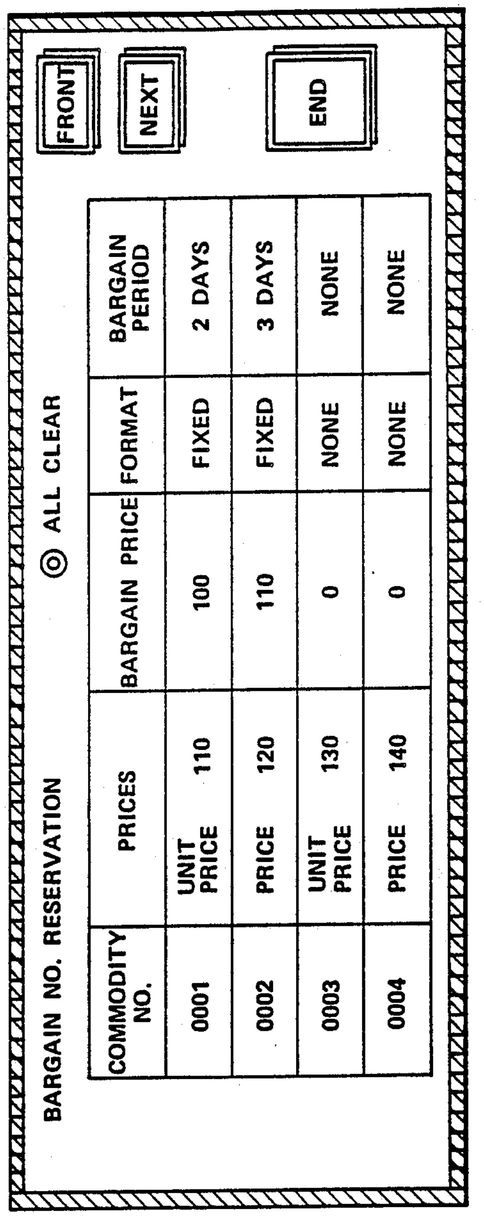
Figure 35E:
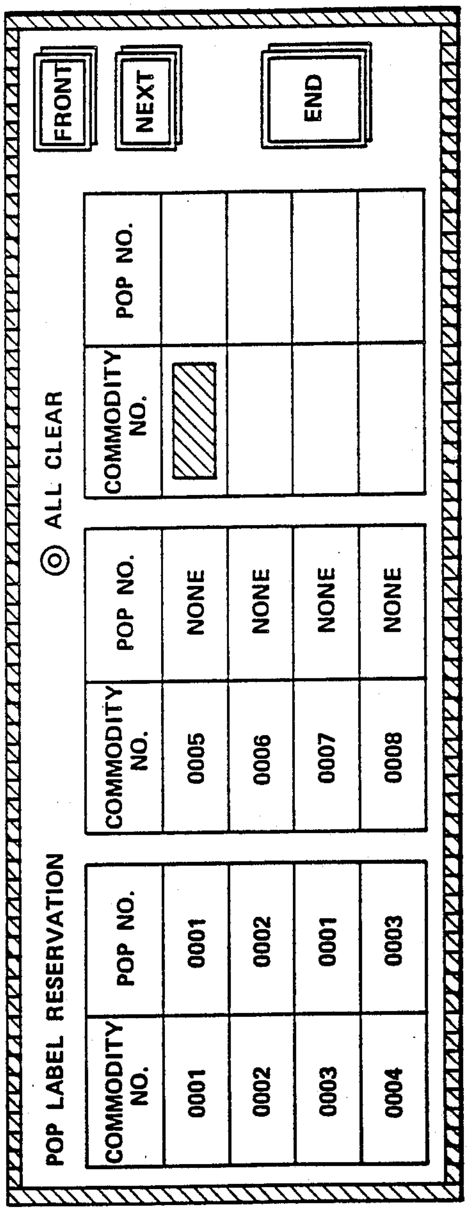

In this case, the reservation mode image is turned to an image as shown in FIG. 35D where predetermined contents are displayed. By touching a displayed character "NEXT" twice, it becomes possible to set the commodity numbers. In this state, the operator inputs the commodity numbers by use of the tenkey 7 and the PLU key 8. Thus, the normal unit price and the bargain price corresponding to each commodity number is read from the PLU file, so that such normal unit price and bargain price are displayed on the display panel 12. Thereafter, the operator can input the bargain period.

(2-3) Third Message

By touching a third position where the third message is displayed in the reservation mode image, the operator can select and execute one of the POP label reservation, the promotion label reservation and the bar code label reservation.

(a) Pop Label Reservation

When the operator touches the third position where the third message "3. POP LABEL RESERVATION" is displayed in the reservation mode image shown in FIG. 35B, the reservation mode image is turned to an image as shown in FIG. 35E, whereby the operator can input the POP No. corresponding to each commodity number.

(b) Promotion Label Reservation

Figure 35F:
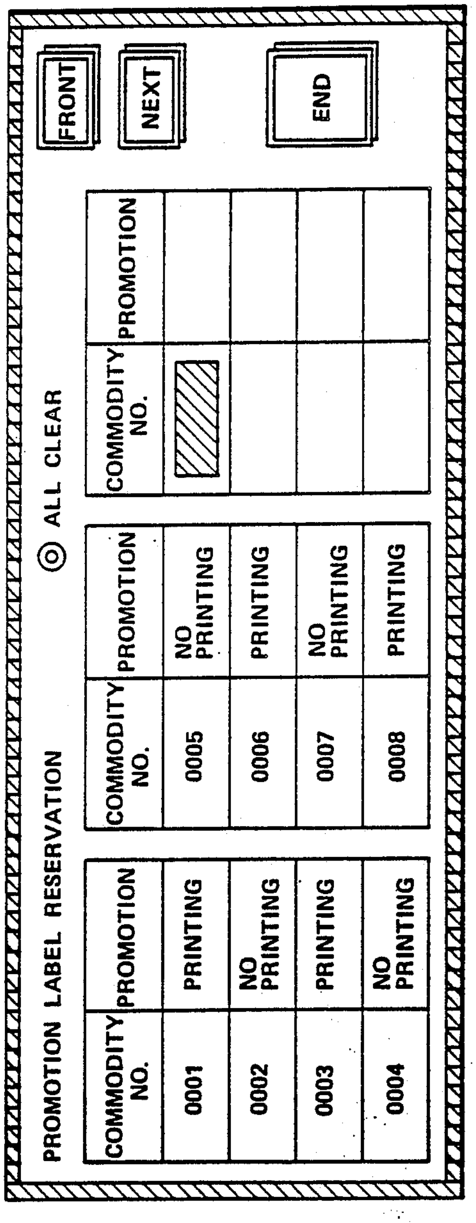

In the reservation mode image where the message "3. PROMOTION LABEL RESERVATION" is displayed at the third position as the third message, the operator touches such third position so that the reservation mode image is turned to an image as shown in FIG. 35F. In such image, the operator can input the commodity numbers each corresponding to each of the commodities, the promotion labels of which are to be published.

(c) Bar Code Label Reservation

Figure 35G:
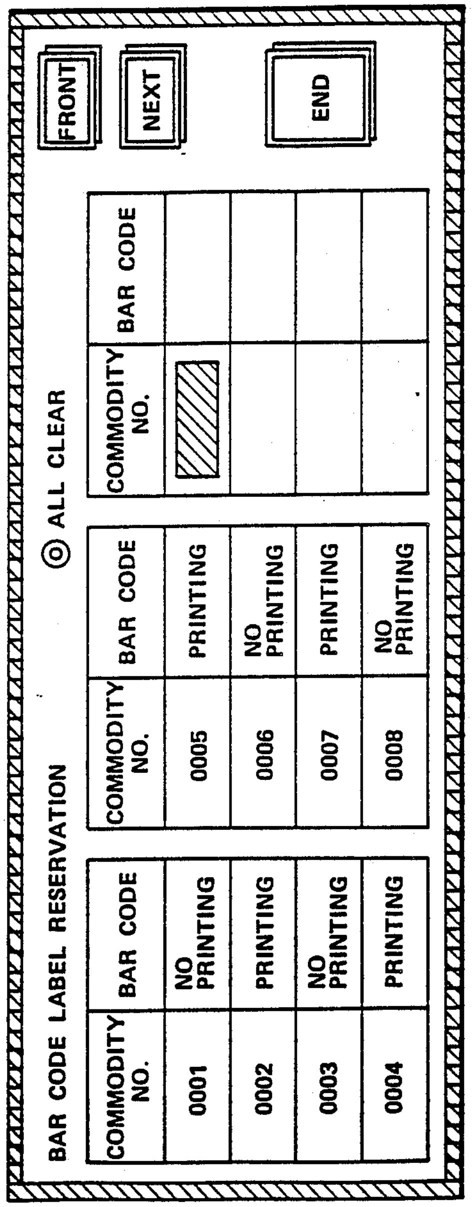
Figures 36A, 36B, 36C, 36D, 36E, 36F, 36G, 36H:
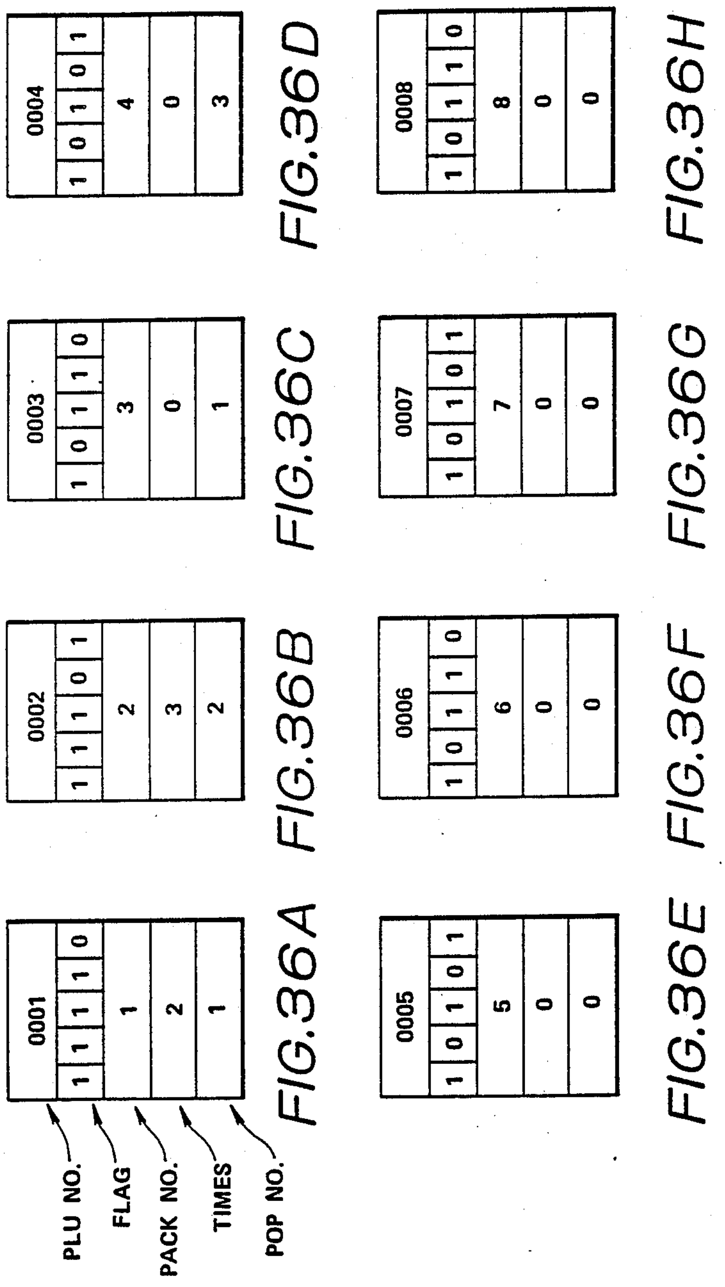
FIGS. 36A to 36H show stored contents of the reservation file at every commodity number.

In the reservation mode image where the message "3. BAR CODE LABEL RESERVATION" is displayed at the third position as the third message, the operator touches such third position so that the reservation mode image is turned to an image as shown in FIG. 35G. In such image, the operator can input the commodity numbers each corresponding to each of the commodities, the bar code labels of which are to be published.

As described heretofore, the contents of data stored in the reservation file 113 can be set as shown in FIGS. 36A to 36H. As for the commodity having the commodity number "0001", the flags YF1 to YF4 are set, "1" is set to the pack number, "2 days" is set to the bargain days, and "1" is set to the POP No.

Next, description will be given with respect to an actual label publishing operation according to the second embodiment by dividing this actual label publishing operation into a first operation for inputting the commodity numbers and a second operation for printing the labels.

(i) First Operation for Inputting the Commodity Numbers

Figure 37:
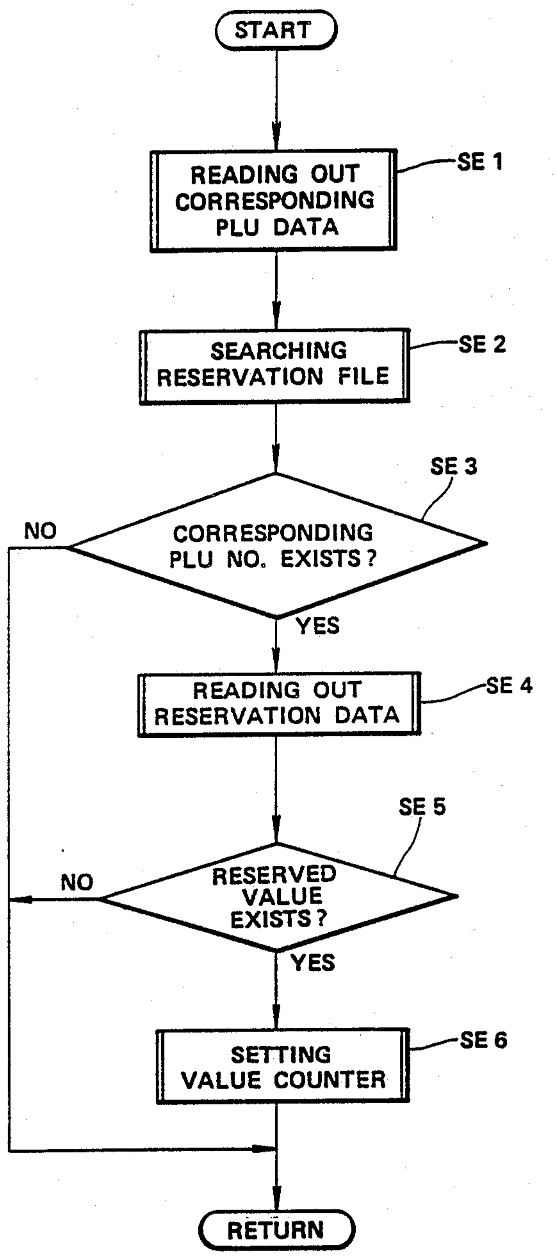
FIG. 37 is a flow chart for explaining an operation when the commodity number is inputted.

By inputting the commodity number, the first operation as shown by a flow chart in FIG. 37 will be executed. At first, the PLU data corresponding to the inputted commodity number are read from the PLU file 112, and such PLU data are set in several registers and also displayed on the display panel 12 in a step SE1. In the case where there is no PLU data corresponding to the inputted commodity number in the PLU file 112, an error message will be displayed.

Next, the CPU 103 searches the reservation file 113 in a step SE2. When the CPU 103 finds the corresponding PLU data in the reservation file 113, the CPU 103 reads out the reservation data and sets such reservation data to several registers in steps SE3 and SE4. If there is no such data the process is terminated after step SE3.

Thereafter, the CPU 103 judges whether the reservation data include reserved values or not in a step SE5. If not the process terminates when the reservation data exist and include such reserved values, the CPU 103 sets value data to a value counter (not shown) in a step SE6. This value counter counts up the number of the published labels so as to output a stop signal when such number of the published labels reach to the value of the value data.

Meanwhile, in a state where the PLU data and the reservation data are read out, it is possible to temporarily change and set such two data. In this case, however, it is not possible to change the files storing such two data. Therefore, it is possible to change the unit price data and also change and set the POP No., for example.

(ii) Second Operation for Printing the Labels

Figure 38:
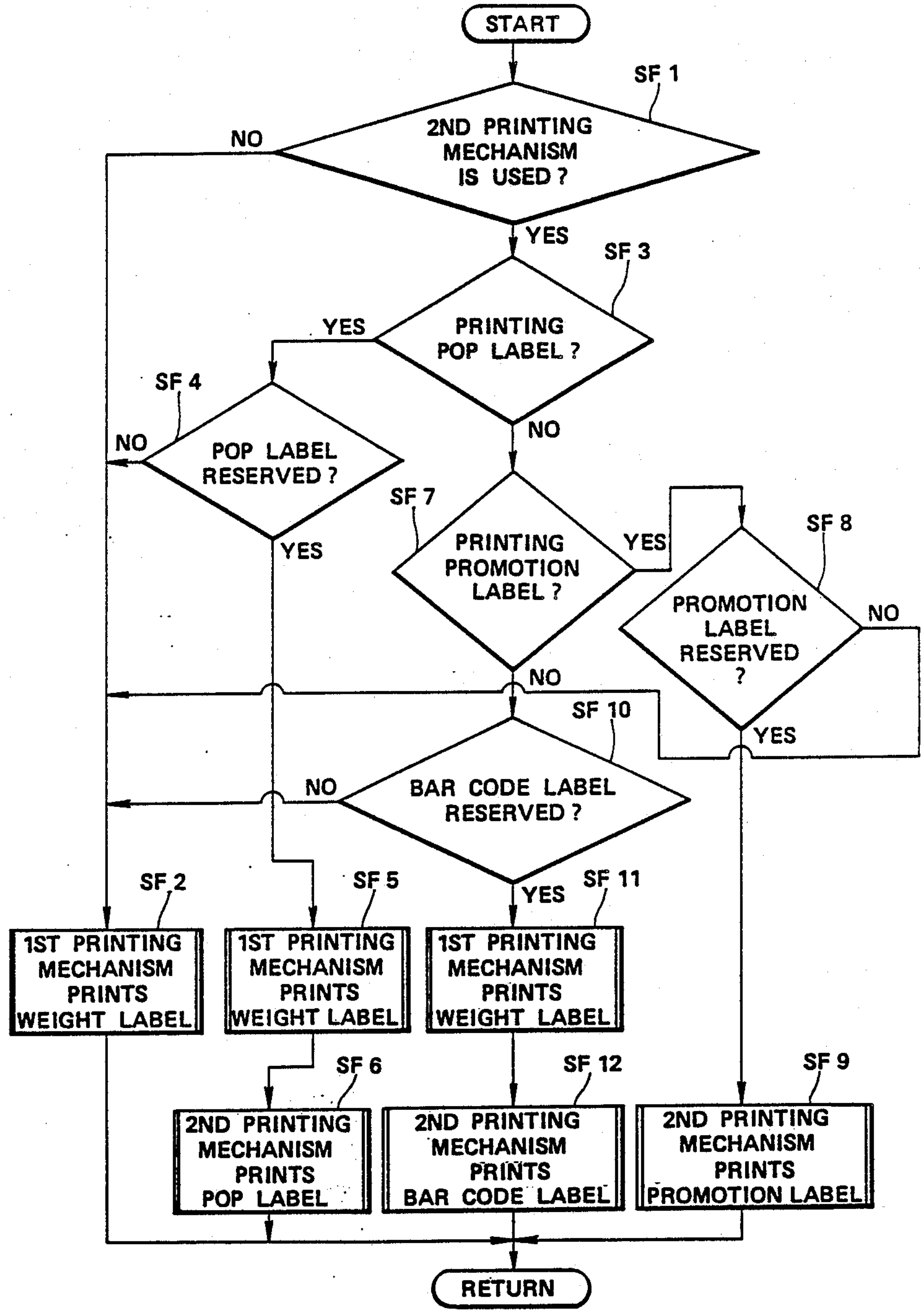
FIG. 38 is a flow chart for explaining a label printing operation.

By operating a print key (not shown), the second operation as shown by a flow chart in FIG. 38 will be executed. When an automatic mode is set in order to automatically print the labels after weighing the weights of the commodities and the weighing equipment 2 outputs a stabilization signal representing that the weighing operation is stabilized, the CPU 103 will start to execute the second operation as shown by a flow chart in FIG. 38.

In such flow chart, the CPU 103 judges whether the second printing mechanism 4 will be used or not based on the used mode flag PF1 shown in FIG. 34 in a first step SF1. When the used mode flag PF1 is set, the CPU 103 judges that the second printing mechanism 4 is not used, hence, the first printing mechanism 3 prints the weight label only in a step SF2.

On the other hand, when the CPU 103 judges that the second printing mechanism 4 is used (i.e., when the used mode flag PF1 is not set), the CPU 103 judges whether the used mode of the second printing mechanism 4 is the print mode of the POP label or not in a step SF3. In this case, the CPU 103 judges that the present used mode is the print mode of the POP label when the used mode flag PF2 is set. In this print mode of the POP label, the present process advances to a next step SF4, wherein the CPU 103 judges whether there is a reservation of the POP label or not based on the flag YF3 in the reservation file 113. When the flag YF3 is not set, the CPU 103 judges that there is no reservation of the POP file. Hence, the present process advances to the step SF2 again, whereby the first printing mechanism 3 prints the weight label only. On the other hand, when the CPU 103 judges that there is the reservation of the POP file in the step SF4 (i.e., when the flag YF3 is set), the first printing mechanism 3 prints the weight label in a step SF5 and the second printing mechanism 4 also prints the POP label in a step SF6.

When the CPU 103 judges that the present mode is not the print mode of the POP label in the step SF3, the CPU 103 judges whether the present mode is the print mode of the promotion label or not based on the used mode flag PF3 in a step SF7. When the used mode flag PF3 is set, the CPU 103 judges that the present mode is the print mode of the promotion label, and the present process advances to a next step SF8. In this step SF8, the CPU 103 judges whether there is a reservation of the promotion label or not based on the flag YF4 in the reservation file 113. When the flag YF4 is not set, the CPU 103 judges that there is no reservation of the promotion label, and the present process advances to the step SF2 wherein the first printing mechanism 3 prints the weight label only. On the other hand, when the CPU 103 judges that there is the reservation of the promotion label in the step SF8 (i.e., when the flag YF4 is set), the second printing mechanism 4 prints the promotion label in a step SF9.

When the CPU 103 judges that the present mode is not the print mode of the promotion label in the step SF7, the CPU 103 judges whether the present mode is the print mode of the bar code label or not based on the flag YF5 in the reservation file 113 in a step SF10. When the flag YF5 is not set, the CPU 103 judges that there is no reservation of the bar code label. Hence, the present process advances to the step SF2, wherein the first printing mechanism 3 prints the weight label only. On the other hand, when the CPU 103 judges that there is the reservation of the bar code label in the step SF10 (i.e., when the flag YF5 is set), the first printing mechanism 3 prints the weight label in a step SF11 and the second printing mechanism 4 also prints the POP label in a step SF12.

Figure 39:
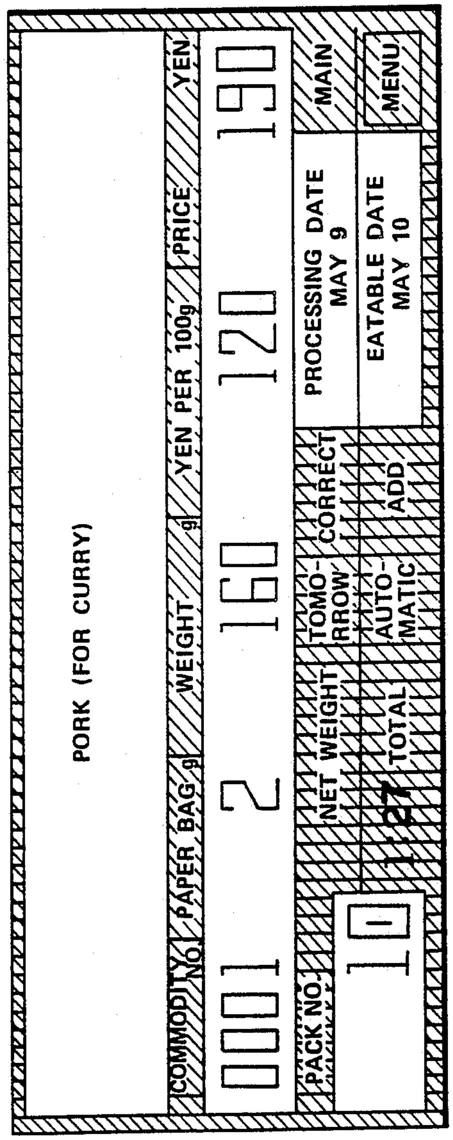
FIG. 39 shows a displayed image when the weight label is printed.

FIG. 39 shows an example of the displayed image on the display panel 12 when the weight label is printed. In the second embodiment, the display panel 12 displays the data (shown in FIG. 39) of the weight label to be printed by the first printing mechanism 3, even if the second printing mechanism 4 prints the POP label. Of course, it is also possible to display the data of the POP label on the display panel 12.

According to the second embodiment, there are two printers such as the first and second printing mechanisms 3 and 4 provided, and the second printing mechanism 4 selectively prints one of the POP label and the promotion label. However, the present invention is not limited to such second embodiment. Hence, it is possible to further provide third and fourth printing mechanisms so as to simultaneously print more than two kinds of labels such as the POP label, the bar code label and the like other than the price label (or the weight label), for example.

In addition, the kinds of the published labels and the combination of the published labels are not limited to the second embodiment.

Further, the second embodiment automatically selects the printing mechanism in response to the commodity number based on the set used mode of the second printing mechanism 4 and the contents of data stored in the reservation file 113. However, the present invention is not limited to the second embodiment. Hence, it is possible to share the mechanism identical to that of the reservation file 113 with the PLU file, for example.

As another example of the second embodiment, it is possible to connect the label printer 1 to an external device such as another label printer (i.e., a parent machine) having a host computer and a managing mechanism. Or, it is also possible to read out and use data stored in a reservation file within such external device.

As described heretofore, according to the second embodiment, the operator can print out the desirable labels by only inputting the commodity numbers without considering a using method of plural printing mechanisms in the pricing operation. Hence, this second embodiment can reduce the burdens of the operator.

[C] THIRD EMBODIMENT

Next, description will be given with respect to a third embodiment of the present invention in conjunction with FIGS. 43 to 58.

The label printer according to the third embodiment is an example of a label printing and attaching apparatus which continuously weighs, packs and prices the commodity.

First, description will be given with respect to a mechanical construction of the third embodiment in conjunction with FIGS. 43 to 50. As shown in a plan view of FIG. 44, the commodity put on the tray is moved along arrows constituting a U-shaped path. While the commodity is moved as described above, the commodity sequentially passes respective working positions of a weighing portion 201, a packing unit 202 and a label printing and attaching unit 203.

Figure 43:
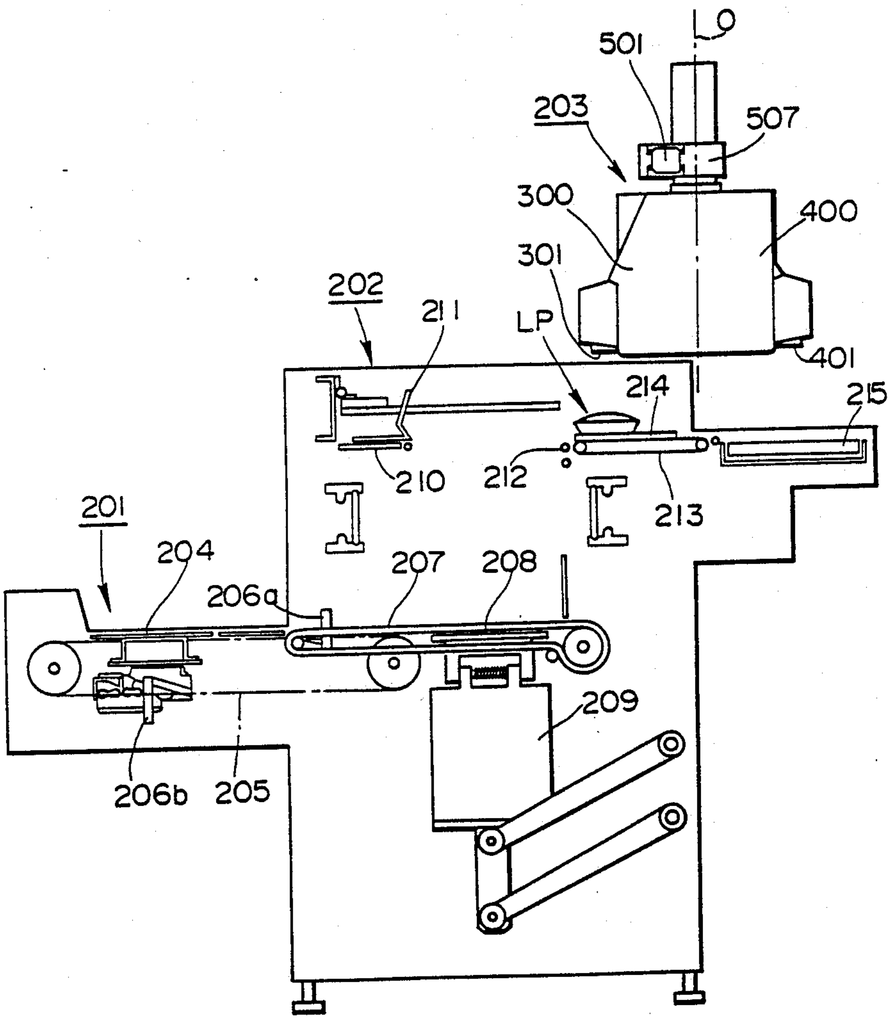
FIG. 43 is a fragmentary cross-sectional view showing a label printer according to a third embodiment of the present invention.
Figure 44:
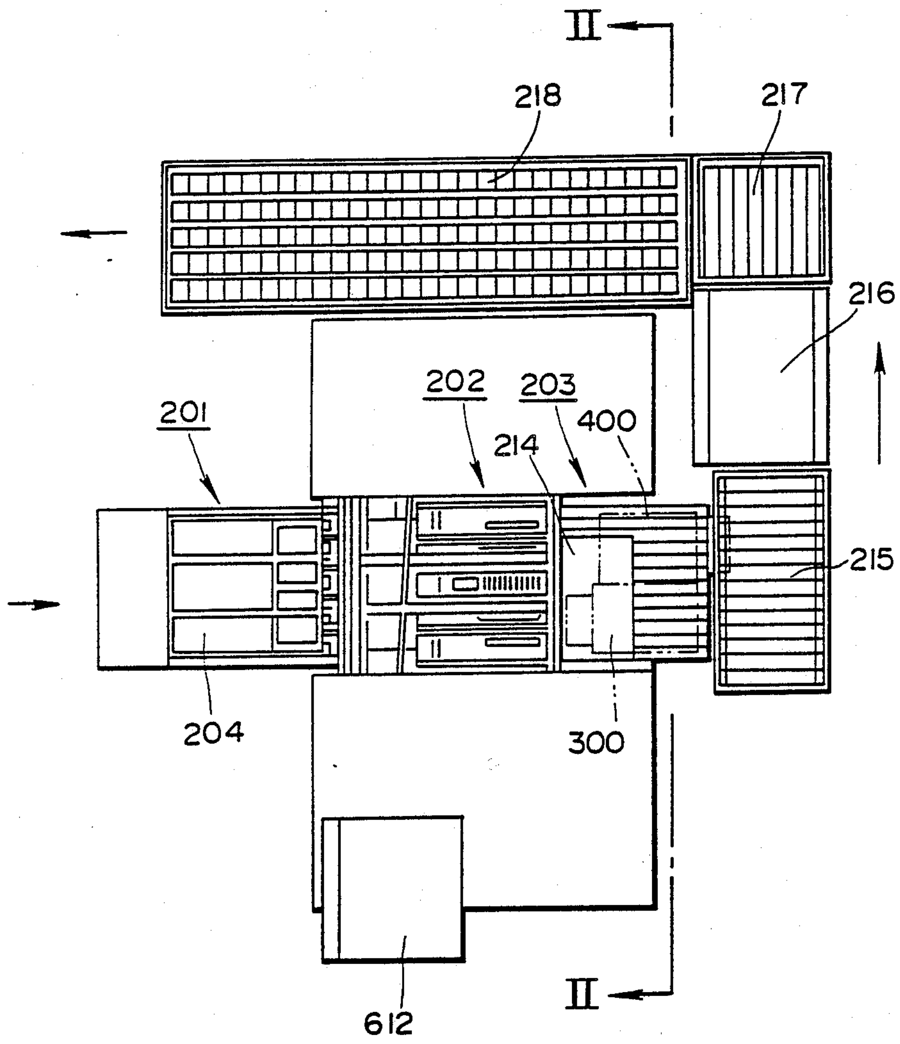
FIG. 44 is a fragmentary plan view showing the third embodiment.

The weighing portion 201 measures whole weight of the commodity put on the tray by use of a weighing pan 204. Thereafter, a pusher conveyor 205 transports the commodity in a right direction as shown in FIG. 43. This pusher conveyor 205 provides two pushers 206*a* and 206*b* each pushing the back of the commodity, so that the commodity is transported on the pusher conveyor 205.

The packing unit 202 receives the commodity transported from the pusher conveyor 205 and delivers such commodity to a transporting conveyor 207, so that the commodity is put on an elevator head 208. While commodity put on the elevator head 208 is elevated together with an elevator 209, an upper face of the commodity is covered with a stretch film. After completing elevating the elevator head 208, right and left folding plates (not shown) and a front folding plate 210 folds right and left edges and a front edge of the stretch film to a bottom of the commodity. Thereafter, discharge pusher 211 discharges the commodity to an adjusting slider 214 arranged on a belt conveyor 213. In the middle of that the discharge pusher 211 discharges the commodity, a back side edge of the stretch film is folded to the bottom of the commodity by a back folding member 212. By sliding the adjusting slider 214 with the discharged commodity in a direction perpendicular to a discharging direction thereof, the position of the commodity is adjusted to a predetermined position.

As described heretofore, the commodity is weighing by the weighing portion 201 and then automatically packed with the stretch film by the packing unit 202. Thereafter, the packed commodity is positioned at a predetermined label attaching position LP (shown in FIG. 43).

The label printing and attaching unit 203 automatically attaches the label on the surface of the commodity at the label attaching position LP. This label is printed and published based on the weight data by every commodity. The third embodiment provides two label printing units, i.e., first and second label printing units 300 and 400. These label printing units 300 and 400 are connected together so that these label printing units 300 and 400 can be revolved around an axis line O (shown in FIG. 43) which directs up and down. In addition, label publishing openings 301 and 401 of the label printing units 300 and 400 are arranged symmetrically with respect to the axis line O so that the label publishing openings 301 and 401 can be revolved around the axis line O. By revolving the label printing units 300 and 400 together by 180 degrees, one of the label publishing openings 301 and 401 can be selectively positioned right over the label attaching position LP. Therefore, the label is published from one of the label publishing openings 301 and 401 so that the published label is attached on the upper face of the packed commodity. In short, the first and second label printing units 300 and 400 respectively constitute first and second label printing and attaching units.

Concrete description of the label printing and attaching unit 203 containing the label printing units 300 and 400 will be given later. Based on the kind of the commodity, a controller (not shown) automatically selects one of the label printing units 300 and 400. Detailed description of such controller will be given later.

The packed commodity is attached with the label by the label printing and attaching unit 203, and then the labeled commodity is transported by a belt conveyor 213, a roller conveyor 215, a heater conveyor 216, roller conveyors 217 and 218 in series.

Figure 45:
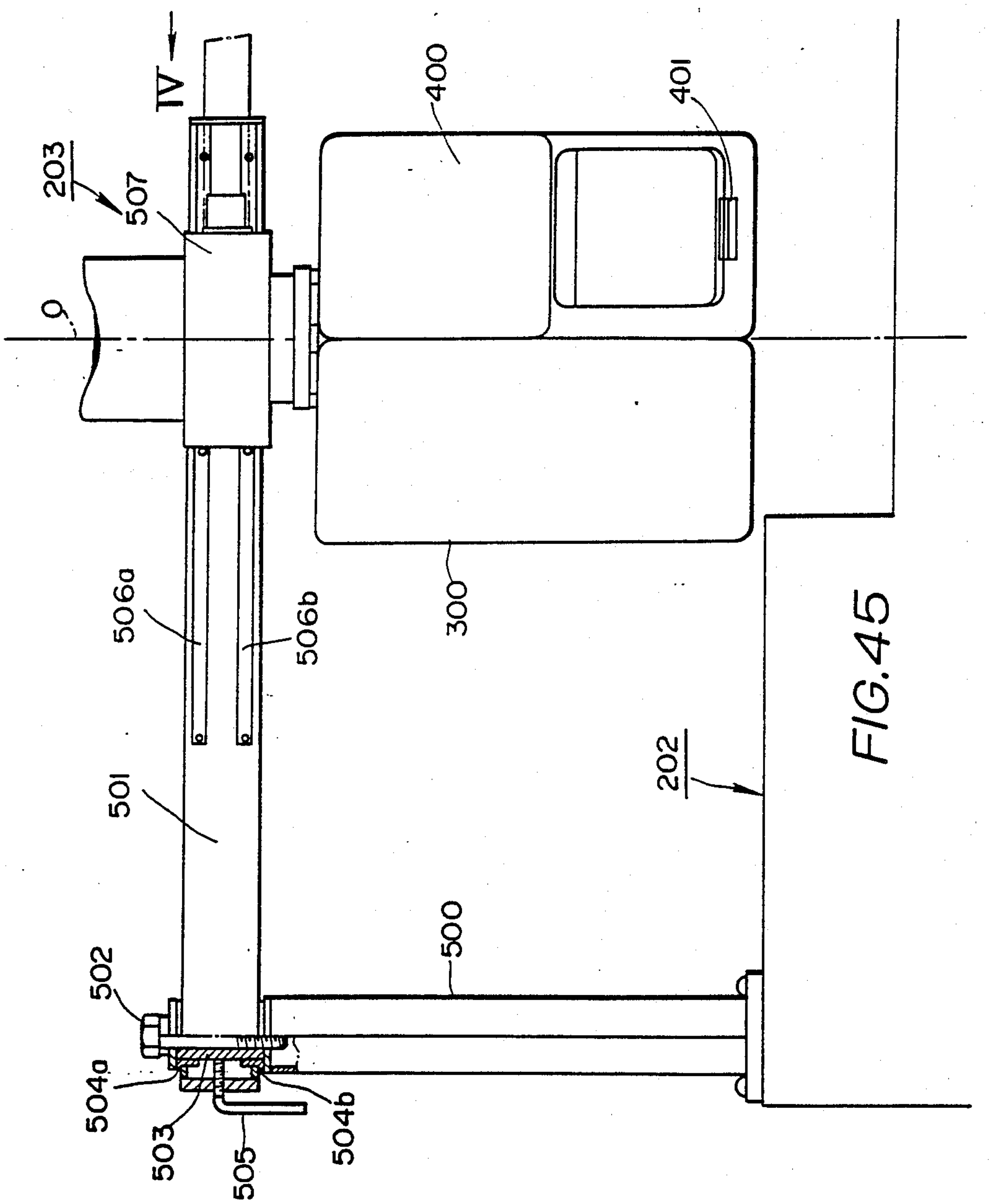
FIG. 45 is a fragmentary sectional view showing the label printer taken along a line II—II shown in FIG. 44.
Figure 50:
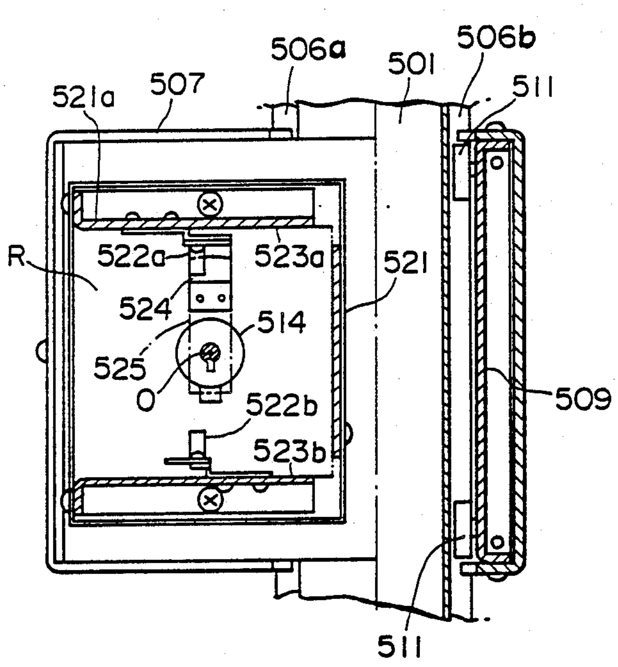
FIG. 50 is a sectional view taken along a line VIII—VIII shown in FIG. 49.

Next, concrete description will be given with respect to the label printing and attaching unit 203 in conjunction with FIGS. 45 and 50.

As described before, the first and second label printing units 300 and 400 are linked together so that the label publishing openings 301 and 401 can be arranged symmetrically with respect to the axis line O. These label printing units 300 and 400 are supported by an arm 501, one edge of which is supported by a supporting post 500 on the packing unit 202. In a linking portion between the supporting post 500 and the arm 501, a shaft 503 is mounted to an upper edge of the supporting post 500 by use of a bolt 502. This arm 501 is connected to the shaft 503 via upper and lower spacers 504*a* and 504*b* so that a base edge portion of the arm 501 can be freely revolved. In addition, a fixed lever 505 is screwed to the base edge portion of the arm 501. By pressing a tip edge portion of the fixed lever 505 against the shaft 503, the arm 501 can be fixed at a predetermined revolving position.

Figure 49:
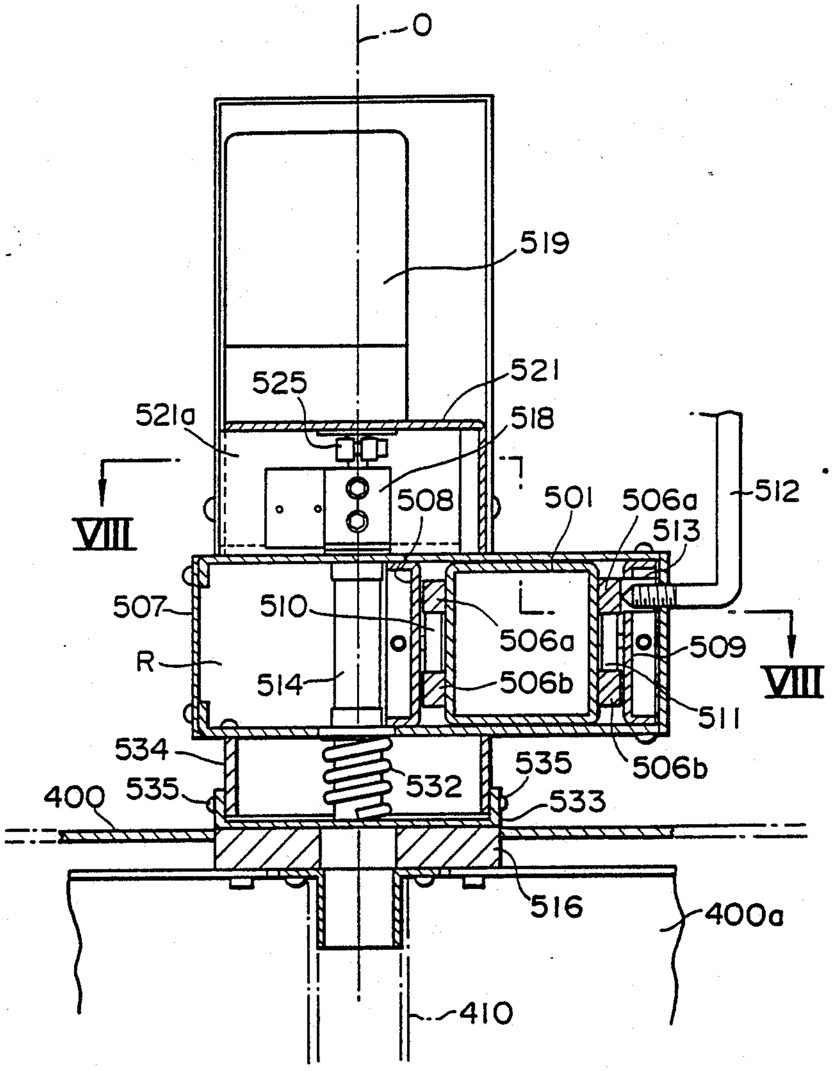
FIG. 49 is a sectional view taken along a line VII—VII shown in FIG. 47.

Two rails 506*a* and 506*b* are respectively mounted to both edge portions of the arm 501. On these rails 506*a* and 506*b*, a sliding case 507 can be slid. As shown in FIG. 49, two side plates 508 and 509 are mounted within the sliding case 507. As for the side plate 508, two rollers 510 capable of freely revolving are mounted between the two rails 506*a* and 506*b* in one side of the arm 501. Similarly, as for the side plate 509, two rollers 511 capable of freely revolving are mounted between the two rails 506*a* and 506*b* in other side of the arm 501. In FIG. 49, the fixed lever 512 is screwed to a right side face of the sliding case 507. A patching member 513 made of rubber is mounted at a tip edge portion of the fixed lever 512. By pressing such patching member 513 against the rail 506*a*, the sliding case 507 can be fixed at a predetermined sliding position.

As shown in a left side section of FIG. 49, an isolated air room R is formed by one side plate 508 within the sliding case 507. In addition, a shaft 514 is inserted through the air room R in upward and downward directions so that the shaft 514 can be freely revolved. In this case, a shaft line of the shaft 514 is identical to the axis line O so that the label printing units 300 and 400 can be revolved around the revolving shaft 514.

Figure 47:
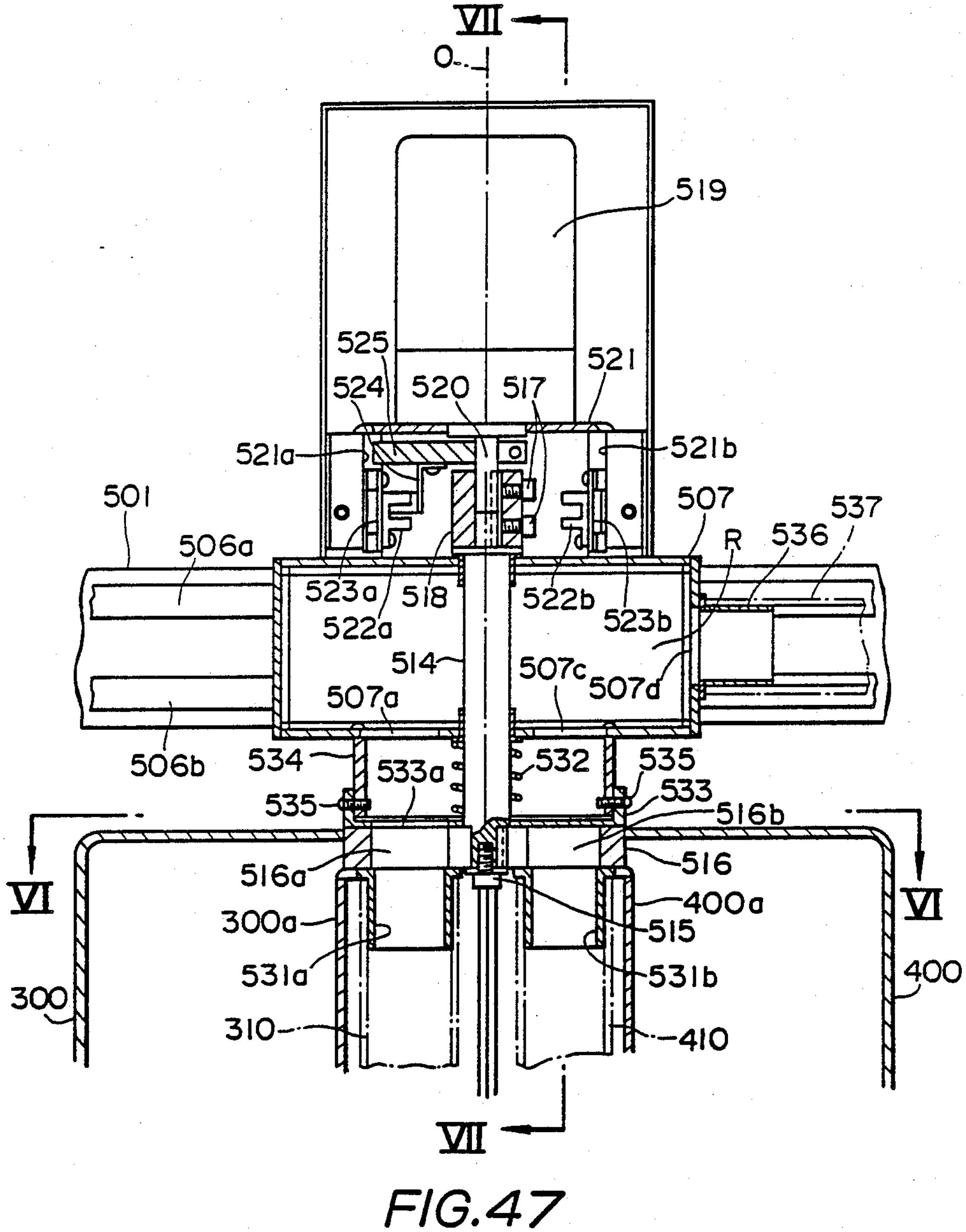
FIG. 47 is a magnified sectional view taken along a line V—V shown in FIG. 46.

As shown in FIG. 47, a supporting member 516 is mounted to an lower edge portion of the shaft 514 by use of a bolt 515, and upper portions of base plates 300*a* and 400*a* are fixed to a lower face of the supporting member 516. In addition, a linking member 518 is mounted on an upper edge portion of the shaft 514 in order to link this shaft 514 by bolts 517 together with an output shaft 520 of a motor 519. The motor 519 is mounted on a motor mounting table 521 which is fixed on the sliding case 507. Two legs 521*a* and 521*b* are fixed to the motor mounting table 521 in an opposite manner. Further, two detectors 522*a* and 522*b* are arranged within insides of the two legs 521*a* and 521*b*. These detectors 522*a* and 522*b* are arranged via mounting plates 523*a* and 523*b* at respective positions which are apart by 180 degrees. When one flag 524 is moved selectively to one of the detectors 522*a* and 522*b*, the selected detector detects the flag 524 so as to output a detection signal. This detection signal stops the motor 519 to revolve. The flag 524 is mounted to the output shaft 520 of the motor 519 by use of a bar 525, so that the flag 524 can be revolved together with the shaft 514. In other words, the flag 524 is revolved together with the label printing units 300 and 400.

As described heretofore, the label printing units 300 and 400 are linked to the motor 519 via the shaft 514, whereby the label printing units 300 and 400 are revolved around the axis line O by the motor 519. By revolving the label printing units 300 and 400 by 180 degrees, one of the label publishing openings 301 and 401 is positioned right over the label attaching position LP. In this time, two detectors 522*a* and 522*b* alternatively detect the flag 524.

Next, description will be given with respect to constructions of the label printing units 300 and 400. Both of these label printing units 300 and 400 have the same construction which provides a printing and publishing function and a label attaching function. Hence, description will be only given with respect to the construction of the second label printing unit 400 in conjunction with FIG. 46.

Figure 46:
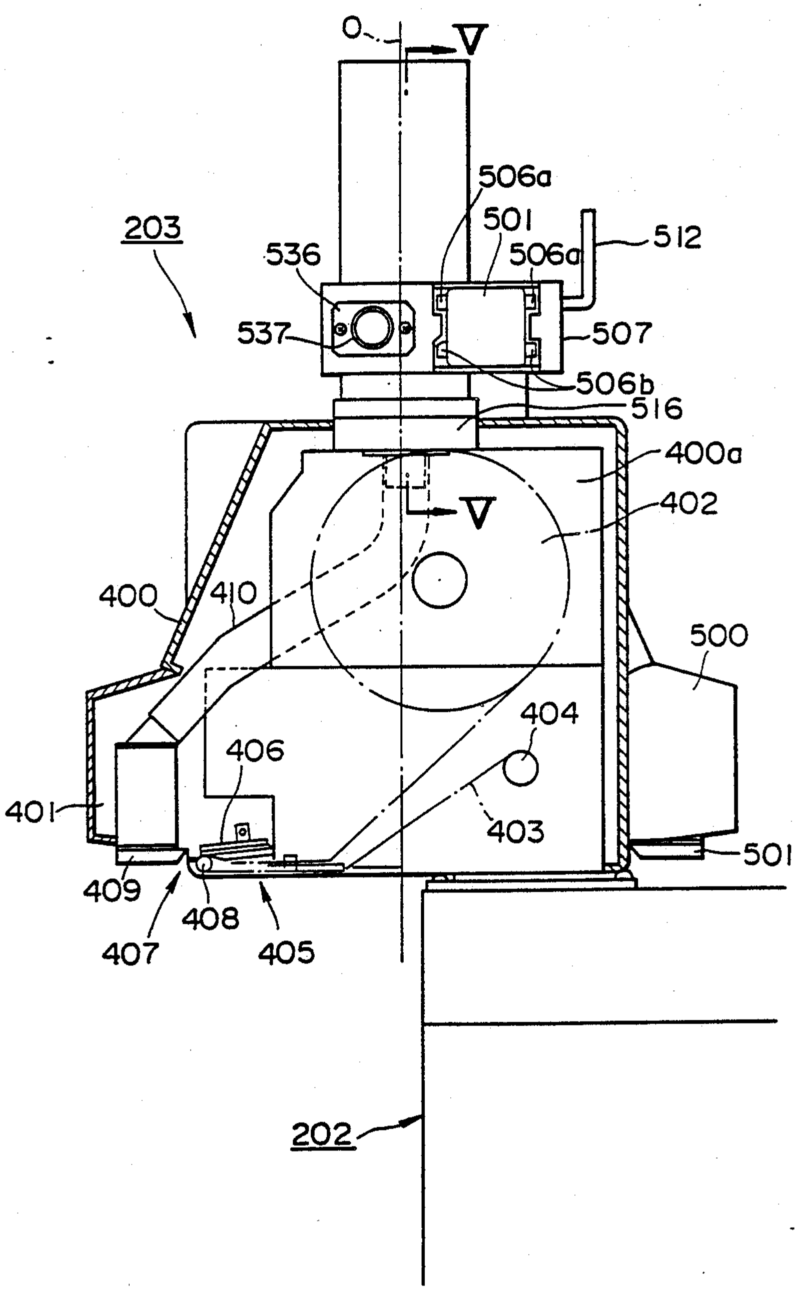
FIG. 46 is a sectional view taken in a direction IV shown in FIG. 45.

In FIG. 46, 402 designates a label roll which is constituted by a plurality of labels all attaching on a mount 403. While the mount 403 is taken up by a mount take-up roller 404, the labels are printed, published and attached on the packed commodities. More specifically, the labels attaching on the mount 403 are guided to a printing portion 405 at first. Then, while the labels are sandwiched and transported between a thermal head 406 and a platen roller 408 by a predetermined distance, predetermined data are printed on each label. Thereafter, a label peeling portion 407 inverts a transporting direction of the mount 403 by 180 degrees, and peeled labels are sent to the label publishing opening 401. This label publishing opening 401 provides a sucking and blowing body 409. This body 409 temporarily sucks and holds the peeled label, and then this body 409 blows the peeled label against the packed commodity at a predetermined timing so that the peeled label is attached to the packed commodity. Hence, the sucking and blowing body 409 is connected to a blower (not shown) via a pipe 410 and a change-over valve for selectively sucking and exhausting air.

Similar to the second label printing unit 400, the first label printing unit 300 is constructed. However, the labels published from the first label printing unit 300 are different from those published from the second label printing unit 400.

By revolving the first and second label printing units 300 and 400 together by 180 degrees and selectively positioning one of the label publishing openings 301 and 401 right over the label attaching position LP, it is possible to selectively publish one of two different kinds of labels and attach the published label on the packed commodity.

As shown in FIG. 47, regardless of a 180-degree revolution of the first and second label printing units 300 and 400, a common blower (not shown) is selectively connected to one of the pipe 410 of the second label printing unit 400 and a corresponding pipe 310 of the first label printing unit 300.

Two through holes 516*a* and 516*b* are made at respective positions on the supporting member 516 which are shifted by 180 degrees. The pipe 310 of the first label printing unit 300 is connected to a lower edge portion of the through hole 516*a* by use of a pipe mounting member 531*a*, and the pipe 410 of the second label printing unit 400 is connected to a lower edge portion of the through hole 516*b* by use of a pipe mounting member 531*b*. A lower case 533 is pressed against the upper face of the supporting member 516 by a coil spring 532. This lower case 533 is mounted under a pipe-shaped upper case 534 so that the lower case 533 can be freely slid along an axis direction. More specifically, an upper edge of the upper case 534 is airtightly fixed to a lower portion of the sliding case 507, and a plurality of diagrammatically U-shaped notches are made on a lower edge of the upper case 534 by predetermined intervals along a circumference direction. These notches extend in upward and downward directions and fit with ridges of a screw 535. By use of this screw 535, the lower case 533 is mounted to the upper case 534. Thus, the lower case 533 can be slid up and down by a small distance in a state where the lower case 533 airtightly covers a lower opening of the upper case 534. However, when the supporting member 516 is revolved, the lower case 533 is prevented from being revolved.

Figure 48:
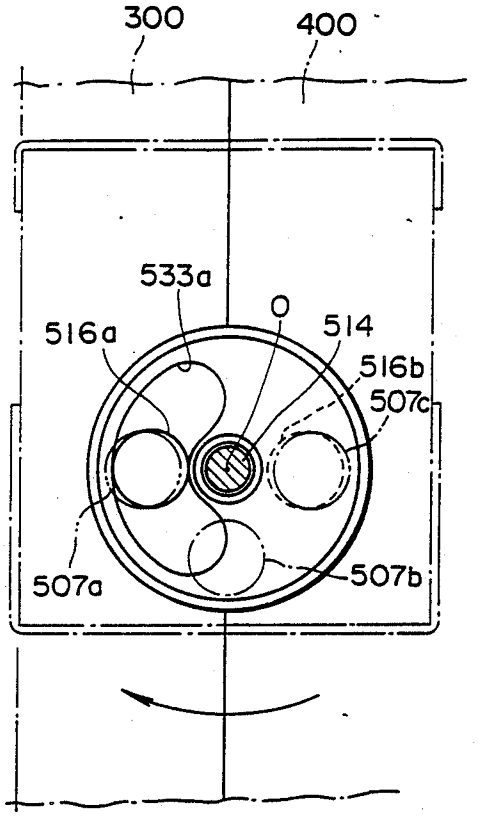
FIG. 48 is a sectional view taken along a line VI—VI shown in FIG. 47.

As shown in FIG. 48, a diagrammatically 180-degree circular through hole 533*a* is formed within the above-mentioned lower case 533. When the label printing units 300 and 400 are revolved by 180 degrees, the through hole 533*a* coincides with one of the through holes 516*a* and 516*b* of the supporting member 516. In addition, three through holes 507*a*, 507*b* and 507*c* each having a circular shape are made on a certain part of the lower face of the sliding case 507 which positions within the upper case 534. These through holes 507*a* to 507*c* are arranged by 90 degrees and led to the air room R. Further, a circular through hole 507*d* leading to the air room R is made at one side plate of the sliding case 507. One edge of a pipe 537 is connected to this through hole 507*d* by use of a pipe mounting member 536. This pipe 537 is connected to a blower (not shown) via a change-over valve (not shown) for selectively sucking and exhausting the air.

As shown in FIGS. 47 and 48, when the first label printing unit 300 prints, publishes and attaches the label to the packed commodity, the pipe 310 leads to the upper case 534 via the through holes 516*a* and 533*a*, and the upper case 534 is led to the blower via the through holes 507*a* to 507*d*, the pipe 537 and the change-over valve. On the other hand, when the second label printing unit 400 prints, publishes and attaches the label to the packed commodity, the supporting member 516 is revolved by 180 degrees together with the first and second label printing units 300 and 400 along an arrow direction shown in FIG. 48. As a result, the pipe 410 leads to the upper case 534 via the through holes 516*b* and 533*a*, and the upper case 534 is led to the blower via the through holes 507*a* to 507*d*, the pipe 537 and the change-over valve. After all, the blower is selectively connected to the selected label printing unit, regardless of a 180-degree revolution of the first and second label printing units 300 and 400.

Next, description will be given with respect to an electric constitution of the third embodiment having the above-mentioned mechanical construction.

Figure 51:
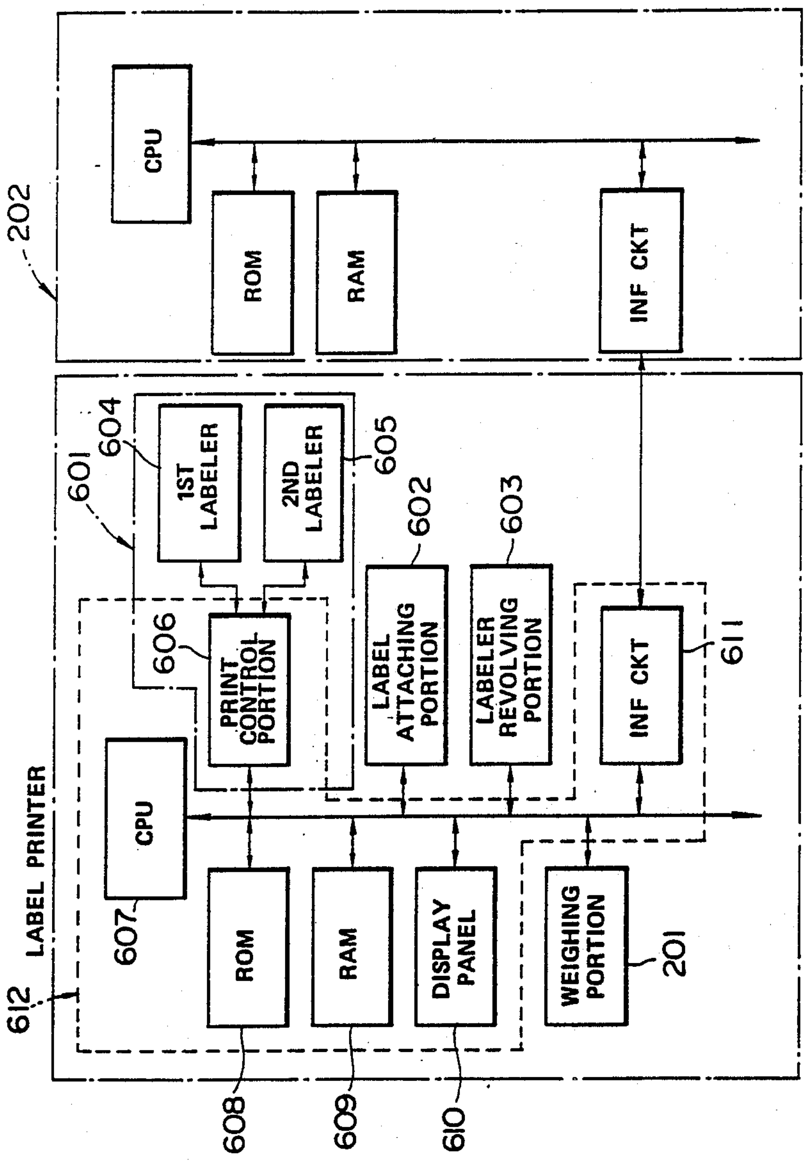
FIG. 51 is a block diagram showing the label printer according to the third embodiment.

In a block diagram shown in FIG. 51, first and second control portions are respectively shown. The first control portion is a control portion for the label printer which contains the weighing portion 201 and the first and second label printing units 300 and 400, and the second control portion is provided for the automatic packing machine concerning the packing unit 202. The second control portion has a general constitution, hence, description thereof will be omitted.

Meanwhile, constitutions of the first and second label printing units 300 and 400 are divided into a label printing portion 601, a label attaching portion 602 and a labeler revolving portion 603 as shown in FIG. 51.

The above-mentioned label printing portion 601 consists of a first labeler 604, a second labeler 605 and a print control portion 606 for controlling the first and second labelers 604 and 605. The first labeler 604 corresponds to a label printing and publishing function of the first label printing unit 300, and the second labeler 605 corresponds to a label printing and publishing function of the second label printing unit 400. In addition, the label attaching portion 602 corresponds to a label attaching function of the first and second label printing units 300 and 400. More concretely, the function of the label attaching portion 602 corresponds to that of the change-over valve for selectively sucking and exhausting the air which is controlled so that the packed commodity can be attached with the label printed and published by one of the first and second label printing units 300 and 400 when the position of the packed commodity is adjusted to the predetermined label attaching position LP. Further, the labeler revolving portion 603 functions to revolve the first and second label printing units 300 and 400 together by 180 degrees. More concretely, the function of the labeler revolving portion 603 is identical to that of the motor 519, the shaft 514 of which is revolved by using the detection signals of two detectors 522 as feedback signals.

In addition, a console section 612 (shown in FIG. 44) consists of the print control portion 606, a CPU 607, a ROM 608, a RAM 609, a display panel 610 and an interface circuit (INF circuit) 611 for the packing unit 202 (FIG. 51).

Next, detailed description will be given with respect to an essential part of the first control portion for the label printer.

The ROM 608 stores control programs which will be described later.

Figures 52, 53, 54:
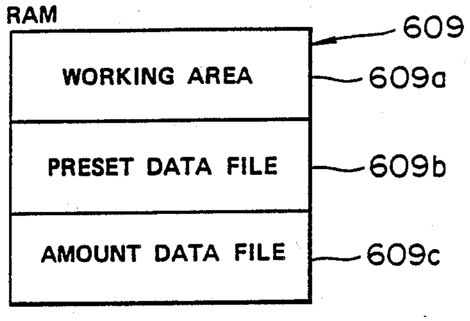
FIG. 52 is a conceptional view of a RAM.
FIG. 53 shows contents of a preset data file.
FIG. 54 shows contents of a label printing buffer.

As shown in FIG. 52, the RAM 609 provides a working area 609*a* for registers, flags and several buffers, a preset data file 609*b* and an amount data file 609*c*.

As shown in FIG. 53, the preset data file 609*b* prestores data for printing the pricing label representative of the unit price, the paper bag weight, the commodity name and the like, the kind of the used labeler and packing parameter for the packing unit 202 in correspondence with the commodity number (i.e., the PLU No.). When publishing the label, it is possible to call the above-mentioned data by only inputting the commodity number. In an example shown in FIG. 53, the preset data file 609*b* pre-stores preset data representative of the unit price "150 (yen)", the paper bag weight "3 (g)", the commodity name "CHOPPED PORK", the used labeler "1ST LABELER" and the packing parameter "3" in correspondence with the commodity number "125". The packing parameter is the parameter which is designated in response to a length and tension-proof strength of the packing film and a tray type. Based on such packing parameter, the packing unit 202 can pack the commodity well, regardless of the commodity kind and a tray size.

The amount data file 609*c* amounts results of the published labels (i.e., results of the prices) by every commodity number.

The working area 609*a* provides a label printing buffer (shown in FIG. 54) for storing the print data of the previously weighed commodity in addition to the other print data of the presently weighing commodity. When the weight of the presently weighing commodity becomes stable, a print command is outputted. Due to this print command, a first label is printed with the print data of the previously weighed commodity, and then this printed first label is published. Thereafter, a second label is printed with the print data of the presently weighing commodity, and then this printed second label is published. Therefore, the label is normally printed with the preceding print data of the commodity which has been already weighed before the presently weighing commodity is weighed. This is why one commodity which has been previously weighed must be normally stopped on a transporting line between the weighing portion 201 and the labeler. In an example shown in FIG. 54, data shown in an upper column represent the print data of the previously weighed commodity, and other data shown in a lower column represent the print data of the presently weighing commodity. When the weight of the presently weighing commodity becomes stable and the print command is outputted, the label is printed and published by using the data in the upper column of FIG. 54 as the print data at first. Next, the label is printed and published by using the data in the lower column of FIG. 54 as the print data.

The display panel 610 (shown in FIG. 51) can display the print data on a full screen including the liquid crystal dots and can also input several kinds of data by use of the touch panel.

The data representative of mutual status information are transferred between the first INF circuit 611 of the label printer and the second INF circuit of the packing unit 202. In addition, packing control data (representative of the film length, the tray type and the tension-proof strength of the film) are transmitted from the first INF circuit 611 to the second INF circuit. Further, a completion signal representative of an end timing for adjusting the packed commodity is transmitted from the second INF circuit to the first INF circuit 611.

Figure 55:
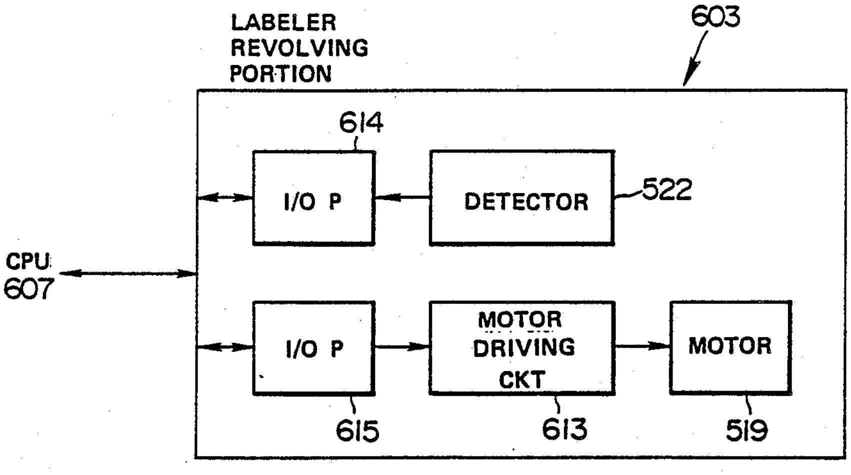
FIG. 55 is a block diagram showing a labeler revolving portion.

FIG. 55 shows an electric constitution of the labeler revolving portion 603. As shown in FIG. 55, this labeler revolving portion 603 comprises the detector 522 (shown in FIG. 47), the motor 519, a motor driving circuit 613, I/O ports 614 and 615. This labeler revolving portion 603 is connected to the CPU 607 of the label printer.

Next, description will be given with respect to an operation of the third embodiment in conjunction with FIG. 56. First, the commodity number of the commodity to be weighed is inputted from the display panel 610. Then, the CPU 607 calls (or reads) the preset data corresponding to the inputted commodity number from the preset data file 609*b* of the RAM 609, and such called preset data are stored in several registers in a step SG1.

Thereafter, the CPU 607 inputs the weight data of the commodity which is put on the weighing pan 204 of the weighing portion 201 (shown in FIG. 43) in a step SG2. Based on the inputted weight data, the CPU 607 judges whether the weight of the commodity becomes stable or not in a step SG3. Steps SG3 and SG2 are repeated until the weight is stable.

When the weight of the commodity becomes stable, the CPU 607 calculates the price of the commodity based on the weight data at this time. This calculated price of the commodity is stored and also displayed on the display panel 610 in a step SG4.

Based on the preset data, one of the first and second labelers 604 and 605 is selected and set as the used labeler in a next step SG5. This labeler setting process will be described later.

In a next step SG6, the packing unit 202 is started up. More concretely, a packing starting signal and a packing parameter are transmitted to the packing unit 202. On the assumption that the packing unit 202 itself can be ready to start up, the packing unit 202 starts to pack the commodity. In this case, while a new commodity is started to be transported to the packing unit 202, the former commodity is packed and transported out from the packing unit 202.

Thereafter, the label is printed with the print data of the previously weighed commodity in a step SG7. In this case, the labeler which will print the label has been already set in the step SG5, i.e., such labeler is identical to selected one of the first and second labelers 604 and 605. After printing the label, the print data of the presently weighed commodity will be set as the print data of the previously weighed commodity.

In a next step SG8, the CPU 607 judges whether the completion signal is transmitted from the packing unit 202 or not. In other words, the CPU 607 judges whether the position of the packed commodity is adjusted to the predetermined label attaching position LP or not. If it is not, step SG8 is repeated until it is, i.e. the CPU 607 waits until the commodity is at LP.

When the above completion signal is inputted, the label which is printed in the step SG7 is attached to the commodity at the label attaching position LP in a step SG9. In order to attach the label to the commodity, the change-over valve arranged between the labeler and the blower is driven by use of the solenoid, so that the air is blown to the label. After attaching the label to the commodity, the print data are amounted in the amount data file **609*c* of the RAM 609**.

Figure 57:
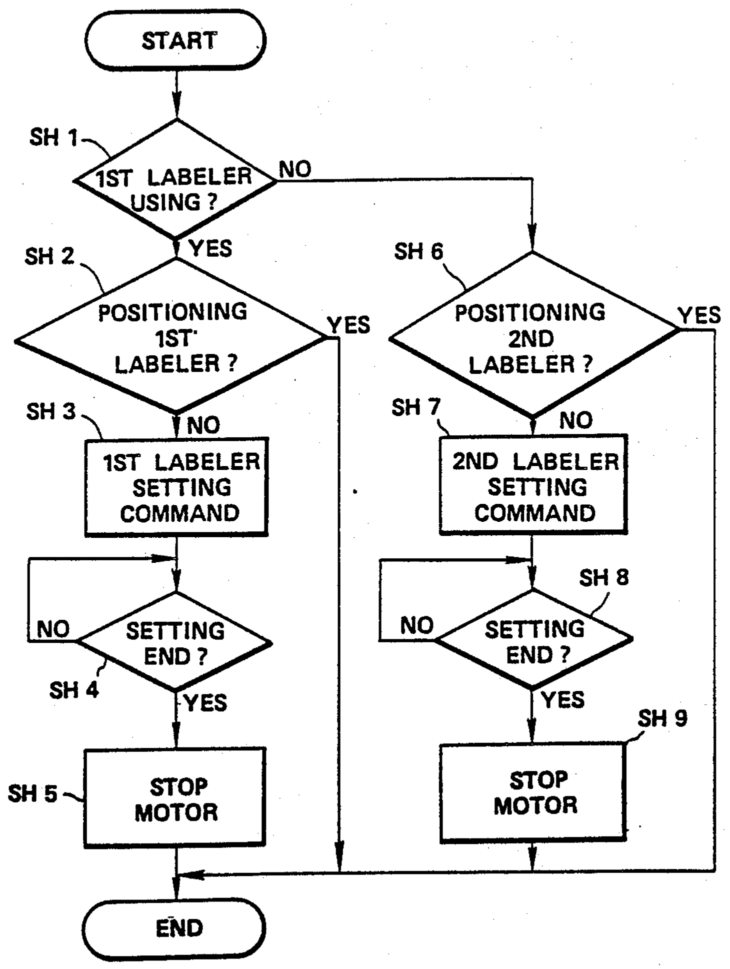
FIG. 57 is a flow chart for explaining a set process of the labeler.
Figure 58:
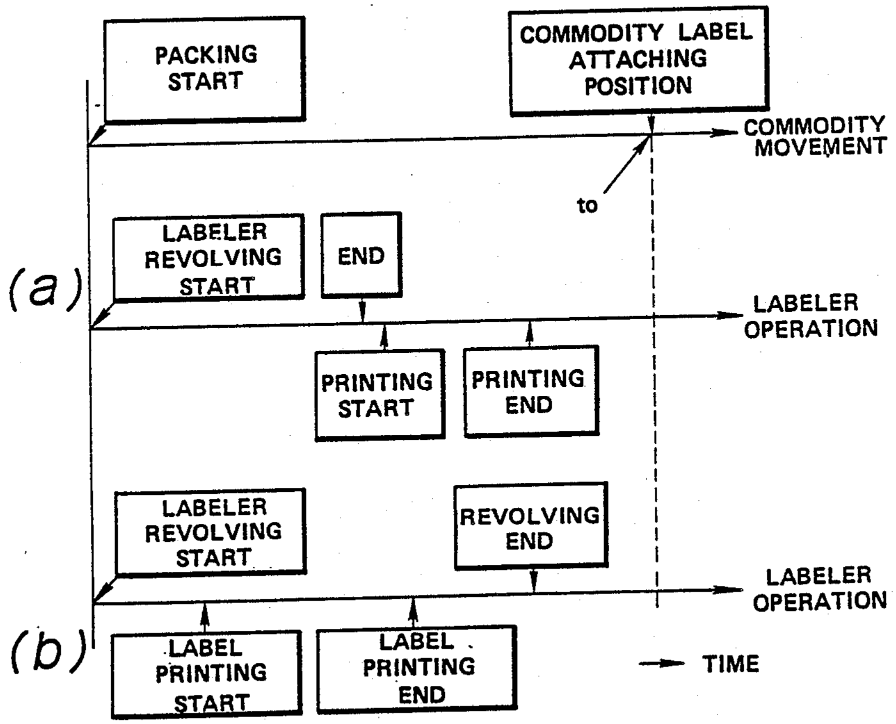
FIGS. 58(*a*) and 58(*b*) show time charts showing an operating relation between a packaging equipment and the labeler.

Next, description will be given with respect to the labeler setting process in the step SG5 in conjunction with FIG. 57.

In a first step SH1, the CPU 607 judges whether the first labeler 604 is designated as the labeler for printing the print data on the label or not.

When the CPU 607 judges that the first labeler 604 is designated, the present process advances to a next step SH2 wherein the CPU 607 judges whether the first labeler 604 is set or not. More specifically, based on the detection signals of the two detectors 522, the CPU 607 judges whether the first labeler 604 is set right over the predetermined label attaching position LP or not.

Figure 56:
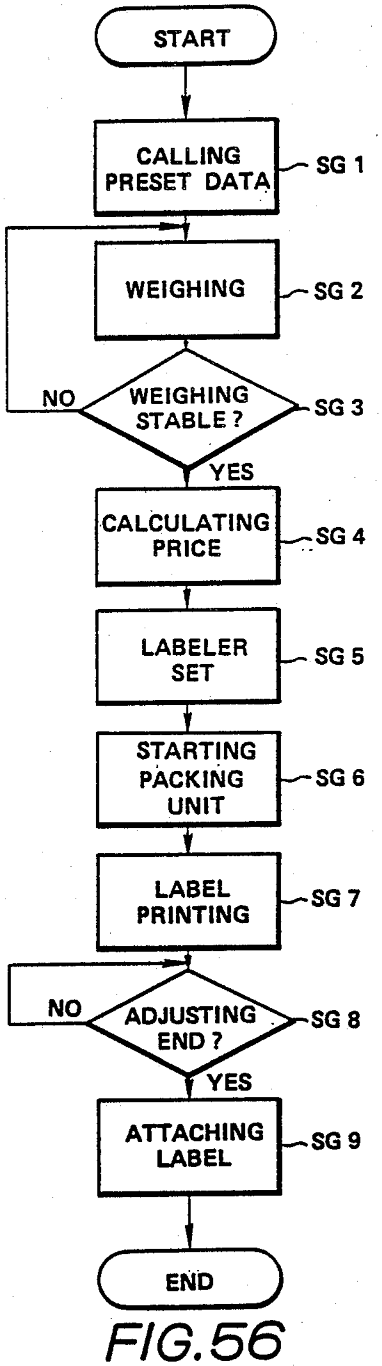
FIG. 56 is a flow chart for explaining a labeling operation of the third embodiment.

When the CPU 607 judges that the first labeler 604 has been already set, this labeler setting process is completed and the present process advances to the step SG6 shown in FIG. 56.

On the other hand, when the CPU 607 judges that the first labeler 604 is not set, the present process advances to a step SH3 wherein the motor 519 is revolved in a right direction of FIG. 48 so that the first labeler 604 will be set right over the label attaching position LP. Thereafter, the CPU 607 judges whether the first labeler 604 is set or not based on the detection signals of the detectors 522 in a step SH4. When a judgment result of the step SH4 is "YES", the motor 519 is stopped revolving, and the display panel 610 displays a message thereof. As long as the judgment in SH4 is "No" the motor continues to rotate. After all, when the first labeler 604 is set, the motor 519 is stopped revolving in a step SH5, and then the labeler setting process is completed.

Meanwhile, when the second labeler 605 is designated as the labeler for printing the print data on the label, the present process advances from the step SH1 to a step SH6 wherein the CPU 607 judges whether the second labeler 605 is set or not. More specifically, based on the detection signals of the two detectors 522, the CPU 607 judges whether the second labeler 605 is set right over the label attaching position LP or not.

When the CPU 607 judges that the second labeler 605 has been already set, the labeler setting process is completed. Then, the present process advances to the step SG6 shown in FIG. 56.

On the other hand, when the CPU 607 judges that the second labeler 605 is not set, the present process advances to a step SH7 wherein the motor 519 is revolved in a left direction of FIG. 48 so that the second labeler 605 will be set right over the label attaching position LP. Thereafter, based on the detection signals of the detectors 522, the CPU 607 judges whether the second labeler 605 is set or nor in a step SH8. If the judgement of step SH8 is "NO" the motor continues to run. When a judgment result of the step SH8 is not turned from "NO" to "YES" within a predetermined period, the motor 519 is stopped, and the display panel 610 displays a message thereof. When the CPU judges that the second labeler 605 is set, the motor 519 is stopped revolving in a step SH9, and then the labeler setting process is completed.

In the third embodiment described heretofore, the CPU 607 of the label printer controls the labeler revolving portion 603. However, the present invention is not limited to that. Hence, it is possible to re-design the third embodiment so that the CPU of the packing unit 202 controls the labeler revolving portion 603. More specifically, the labeler revolving portion 603 may be controlled so that the labeler can be selected based on the preset data corresponding to the commodity number and such selected labeler can be set at the predetermined label attaching position LP. Therefore, a concrete controlling method of such labeler revolving portion 603 is not limited to a specific method.

In order to control the labeler revolving portion 603 by the CPU of the packing unit 202, the following two methods (1) and (2) can be employed.

(1) In a first method, the label printer judges whether it is necessary to change the set labeler or not, and the label printer transmits a start-up command for the motor 519 and data representative of the revolving direction of the motor 519 to the packing unit 202.

(2) In a second method, the label printer does not judge whether it is necessary to change the set labeler or not, but the label printer transmits a labeler changing command and data of the used labeler to the packing unit 202, whereby the packing unit 202 judges whether it is necessary to change the set labeler or not.

Incidentally, in the third embodiment, the used labeler is set based on the preset data corresponding to the commodity number. However, the present invention is not limited to that. Hence, it is possible to re-design the third embodiment so that the used labeler can be set by use of a reservation file which is provided independently with the preset data file **609*b***. More specifically, the above reservation file pre-stores several kinds of the print data for a selection of the label kind and the like in correspondence with the commodity number, and the used labeler is set based on such print data. In this case, it is possible to include the promotion label within the labels to be published. This promotion label has a printing format similar to that of the general weight label (or the pricing label), however, the color of the printed data or the pre-printing contents of the promotion label is different from those of the weight label. In short, the present invention must read out the pre-stored data corresponding to the inputted commodity number and then select the labeler based on the read data.

In addition, the third embodiment performs the label printing process after completing the labeler setting process. However, it is possible to perform both of the label printing process and the labeler setting process in parallel.

Further, the third embodiment starts up the packing unit 202 after completing the labeler setting process. However, it is possible to perform the labeler setting process while operating the packing unit 202. For example, in a first modified example of the third embodiment, one commodity is packed and the labeler setting process is completed within one cycle of the packing unit 202, and the packed commodity is stationed at the label attaching position LP when completing one cycle of the packing unit 202. In such first modified example, it is possible to continuously operate the packing unit 202, however, a packing processing ability must not be lowered in this case. On the contrary, in a second modified example of the third embodiment, one commodity is packed but the labeler setting process is not completed within one cycle of the packing unit 202, and the packed commodity is stationed at the label attaching position LP when completing the one cycle of the packing unit 202. In such second modified example, it may be possible to start up the packing unit 202 after completing the labeler setting process and also attaching the label to the commodity. In general, an operating relation between the packing unit 202 and the labeler must satisfy the condition shown in FIGS. 58(*a*) and 58(*b*). In short, the labeler setting process must be completed before a time $t_0$ when the packed commodity is moved to the label attaching position LP.

Incidentally, the third embodiment is an example which assembles the label printer and the packing unit 202 into one body. However, the present invention is not limited to such third embodiment. For example, it is possible to employ the label printer according to the present invention to the following automatically weighing and pricing machine (a) and high-speed automatically weighing and pricing machine (b).

(a) Automatically Weighing and Pricing Machine

In this machine, the commodity is transported to the weighing equipment at first. After waiting that the commodity is stationed, this machine automatically measures the weight of the commodity. Thereafter, the weighed commodity is transported out from the weighing equipment, and such weighed commodity is attached with the label printed with the price thereof.

(b) High-Speed Automatically Weighing and Pricing Machine

While the commodity is transported on the weighing conveyor, the weight of the commodity is automatically measured with a high speed. Thereafter, the commodity is attached with the label printed with the price thereof.

The third embodiment can be applied to a pricing machine without the weighing equipment, e.g., the pricing machine for the commodity having the fixed price.

In addition, the third embodiment determines a timing for attaching the label based on the completion signal which is outputted when completing the adjusting operation for adjusting the position of the commodity to the predetermined label attaching position LP. However, the present invention is not limited to such third embodiment. In a modified example, a commodity sensor can detect that the commodity is reached at the label attaching position LP, and it is possible to determine the timing for attaching the label based on the detection signal of the commodity sensor.

Further, it is possible to selectively move the first and second label printing units 300 and 400 at the predetermined set position by use of sliding means, instead of revolving means such as the labeler revolving portion 603.

Furthermore, the third embodiment uses two label printing and attaching units. However, the present invention is not limited to that. Of course, it is possible to provide more than two label printing and attaching units.

Above is the description of the preferred embodiments. This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A label printer comprising:

(a) a plurality of label printing mechanisms, each capable of printing data on a label in the form of desired dot patterns; and (b) a printer control means to which said plurality of label printing mechanisms are connected in parallel, said printer control means selectively controlling the printing operations of said label printing mechanisms.

2. A label printer according to claim 1, wherein at least one of said label printing mechanisms can be removed from a label printer body, and the removed label printing mechanism can continue to print and publish said label.

3. A label printer according to claim 1 further comprising memory means for pre-storing commodity data in correspondence with commodity numbers which are given to respective commodities, said commodity data for a commodity being read from said memory means by inputting its commodity number, at least one of said label printing mechanisms printing a price of a commodity on a label so as to publish a pricing label based on the commodity data read from said memory.

4. A label printer according to claim 3 further comprising:

a weighing mechanism for measuring the weight of said commodity, and wherein said commodity data includes unit price data representative of a unit price of each commodity, price means for calculating a price for said commodity based on said unit price data and the measured weight of said commodity, means for causing the calculated price of said commodity to be printed on said pricing label, and
attachment means for causing the printed pricing label to be attached to said commodity.

5. A label printer according to claim 3, wherein at least one of the remaining label printing mechanisms prints desirable bar codes on a label so as to publish a bar code label.

6. A label printer according to claim 3, wherein at least one of the remaining label printing mechanisms prints a total of prices of said commodities which have been already priced on a label so as to publish a total label.

7. A label printer according to claim 3, wherein at least one of the remaining label printing mechanisms prints a predetermined advertisement pattern on a label so as to publish an advertisement label.

8. A label printer according to claim 7 wherein said memory means further pre-stores data representing whether said advertisement label must be printed or not, and also representing a kind of advertisement label to be printed when said advertisement label must be printed, said data being pre-stored in said memory means in correspondence with each commodity number, whereby said advertisement label is automatically printed based on said data.

9. A label printer according to claim 3, wherein at least one of the remaining label printing mechanisms prints a price of a commodity on another label so as to publish another pricing label.

10. A label printer according to claim 9, wherein said memory means further pre-stores selection data for selecting the label printing mechanism to be used in correspondence with each commodity number, whereby the label printing mechanism to be used is automatically selected based on the selection data for each commodity.

11. A label printer according to claim 10, wherein one of the selected label printing mechanisms attaches a printed label on said commodity in a length direction, while another of the selected label printing mechanisms attaches a printed label on said commodity in a width direction.

12. A label printer for commodities associated with commodity numbers comprising:

(a) a plurality of printing mechanisms each printing out a specific label;
(b) setting means for setting a label kind for a label to be printed out, and a printing content represented by print data for every commodity number;
(c) memory means for storing data representative of said label kind and said print data, both set by said setting means; and
(d) control means for automatically selecting at least one of said printing mechanisms corresponding to said commodity number based on said label kind and said print data, both stored in said memory means, whereby at least one label is printed out.

13. A label printer according to claim 12 wherein said memory means includes first memory means for pre-storing commodity data in correspondence with each commodity number which is given to each commodity, said commodity data being read from said first memory means by inputting said commodity number, at least one of said printing mechanisms printing a price of a commodity on a label so as to publish a pricing label based on the read commodity data.

14. A label printer according to claim 13 wherein one of the remaining printer mechanisms prints a price pattern similar to that of said pricing label.

15. A label printer according to claim 13 further comprising:

a weighing mechanism for measuring the weight of said commodity, and wherein said commodity data includes unit price data representative of a unit price of each commodity,
price means for calculating a price of said commodity based on said unit price data and the measured weight of said commodity,
means for causing the calculated price of said commodity to be printed on said pricing label, and
attachment means for causing the printed pricing label to be attached to said commodity.

16. A label printer according to claim 13 or 15, wherein one of the remaining printing mechanisms prints a price pattern different from that of said pricing label so as to publish at least one of a promotion label, an advertisement label and a bar code label.

17. A label printer according to claim 16 wherein said advertisement label is printed with a graphic image.

18. A label printer according to claim 17 further comprising an image scanner for inputting said graphic image.

19. A label printer according to claim 16, wherein said memory means further includes second memory means for prestoring data representative of a method for using said printing mechanisms, said data being pre-stored in said second memory means in correspondence with each commodity number.

20. A label printer according to claim 19, wherein said data pre-stored in said second memory means represents information concerning at least one of (a) whether another pricing label, other than said pricing label, must be printed instead of said pricing label, (b) whether said advertisement label must be printed in addition to said pricing label, and (c) whether said bar code label must be printed in addition to said pricing label.

21. A label printer according to claim 19 further comprising display means for displaying said commodity data stored in said first memory means and said data stored in said second memory means when said setting means sets said commodity data and said data to said first and second memory means, respectively.

22. A label printer according to claim 21 wherein said display means provides a touch panel which also constitutes a part of said setting means for setting said commodity data and said data to said first and second memory means.

23. A label printer for printing a label so as to attach the printed label on a commodity comprising:

(a) guiding means for guiding said commodity to a predetermined label attaching position;
(b) a plurality of printing units, each capable of printing a specific label, at least one of said printed labels being attached on said commodity at said label attaching position; and
(c) moving means for selectively moving said printing units so that each printing unit can attach each printed label on said commodity.

24. A label printer according to claim 23 further comprising memory means for pre-storing data representative of said printing unit to be used in correspondence with commodity numbers given to each respective type of commodity, whereby said moving means automatically moves said printing units based on said data.

25. A label printer according to claim 24 wherein said moving means revolves said printing units.

26. A label printer comprising:

(a) guiding means for guiding a commodity to a predetermined label attaching position;

(b) first and second printing units, each capable of printing specific labels, at least one of said first and second printing units selectively publishing a printed label which is attached on said commodity at said label attaching position; and (c) moving means for selectively moving said first and second printing units so that each printing unit can attach each printed label on said commodity.

27. A label printer according to claim 26, wherein said first and second printing units are arranged opposite to each other so that one of said first and second printing units can be selectively positioned over said label attaching position, and wherein said moving means revolves said first and second printing units by 180 degrees.

28. A label printer according to claim 25 or 27, further including attachment means utilizing an air flow to blow said printed label onto said commodity so that said printed label can be attached to said commodity, said air flow being automatically changed by revolving said first and second printing units so that one of said labels printed by said first and second printing units can be selectively attached to said commodity.

29. A label printer according to claim 2 or 26 further comprising:

a weighing unit which measures the weight of said commodity, means for calculating a price of said commodity based on the measured weight and a unit price of said commodity, and means for causing at least one of said printing units to print said price of said commodity on a label so as to publish a pricing label.

30. A label printer according to claim 29 further comprising an automatic packing unit which automatically packs said commodity.

31. A label printer according to claim 30, wherein said weighing unit, said packing unit and said printing units are sequentially arranged so that said commodity can be sequentially weighed, packed and attached with said pricing label.

32. A label printer according to claim 31 further comprising:

(a) memory means for storing first data for printing said pricing label, second data for controlling said packing unit and third data for moving said printing units;

(b) inputting means for inputting commodity numbers, each commodity number being given to a commodity; and (c) reading means for reading out said first to third data corresponding to the inputted commodity number is inputted by said inputting means, print data to be printed on said pricing label being produced based on the first data which is read, said packing unit being controlled based on the second data which is read, and said printing units being moved based on the data which is read.

* * * * *